United States Patent
Oku

(10) Patent No.: US 8,401,364 B2
(45) Date of Patent: Mar. 19, 2013

(54) IMAGING DEVICE AND PLAYBACK DEVICE

(75) Inventor: Tomoki Oku, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 279 days.

(21) Appl. No.: 12/869,922

(22) Filed: Aug. 27, 2010

(65) Prior Publication Data

US 2011/0052139 A1 Mar. 3, 2011

(30) Foreign Application Priority Data

Aug. 28, 2009 (JP) ................ 2009-198247
Jul. 1, 2010 (JP) ................ 2010-150959

(51) Int. Cl.
*H04N 5/77* (2006.01)
*H04N 9/88* (2006.01)

(52) U.S. Cl. ...................... 386/224; 386/263

(58) Field of Classification Search ............ 386/224, 386/210, 263, 264, 285, 321, 323, 339, 338
See application file for complete search history.

(56) References Cited

U.S. PATENT DOCUMENTS 6,572,478 B2 * 6/2003 Miyamoto et al. ........... 463/43
2009/0066798 A1 3/2009 Oku et al.

FOREIGN PATENT DOCUMENTS

| JP | 6302169 | | 10/1994 |
| JP | 08182098 | * | 7/1996 |
| JP | 9312790 | | 2/1997 |
| JP | 11136553 | | 5/1999 |
| JP | 2007257358 | | 4/2007 |
| JP | 200965587 | | 3/2009 |

OTHER PUBLICATIONS

Yoav Freund, et al.; "A decision-theoretic generalization of on-line learning and an application to boosting"; AT&T Bell Laboratories; Sep. 20, 1995; pp. 1-34; Murray Hill, NJ, USA.

* cited by examiner

*Primary Examiner* — Robert Chevalier
(74) *Attorney, Agent, or Firm* — NDQ&M Watchstone LLP

(57) ABSTRACT

The imaging device is provided with at least one imaging part to obtain images through shooting and at least one sound-collection part to obtain audio, collecting it together with the shooting of the imaging part, and at least one display part to display images. It performs audio-correction processing of audio obtained through the sound-collection part according to the relative relationship between the direction in which the display part displays images and the direction in which the imaging part shoots.

12 Claims, 21 Drawing Sheets

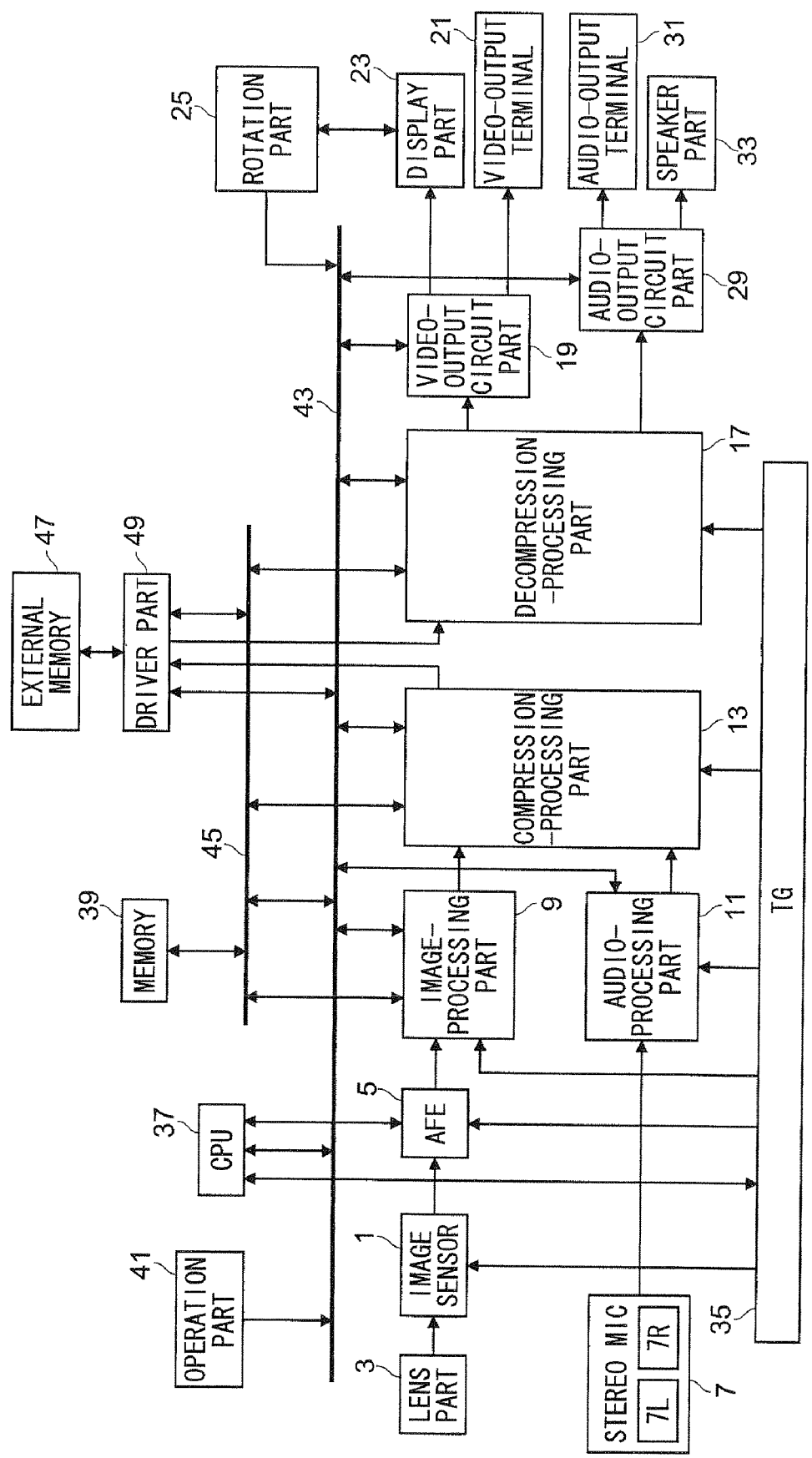

AT TIME OF SELF-SHOOTING MODE

AT TIME OF ORDINARY SHOOTING MODE

AT TIME OF
ORDINARY SHOOTING MODE

AT TIME OF
SELF-SHOOTING MODE

IMAGING DEVICE AND PLAYBACK DEVICE

This application is based on Japanese Patent Application No. 2009-198247 filed on Aug. 28, 2009, and Japanese Patent Application No. 2010-150959 filed Jul. 1, 2010, the contents of which are hereby incorporated by reference.

BACKGROUND OF THE INVENTION

1. Field of the Invention

The invention relates to an imaging device that allows for recording of audio and images and a playback device that allows for the playback of audio and images. In particular, the invention relates to an imaging device that will record audio and a playback device that will process the audio output on the basis of the state of the imaging device at the time of shooting and on the basis of images captured through shooting.

2. Description of Related Art

At present, video cameras are widely available as imaging devices allowing for the recording of both images and audio. Such video cameras are equipped with a display part that has a monitor to display the shooting area (subject) that the imaging part of the video camera captures. The operator establishes the composition and controls focus, for example, while confirming the shooting area through the monitor on this display part.

Typically, the direction in which the monitor displays the image is on the side of the operator, that is to say, the side that is opposite the shooting direction (subject side). However, in recent years, many video cameras have appeared that make it possible for a operator to shoot himself or herself, in other words, to take a so-called "self-shooting," while confirming the shooting area displayed on the monitor by rotating the display part and positioning the display direction of the monitor in the same direction as the shooting direction. It is assumed that when a self-shooting is taken, the operator wants to shoot a video centered on himself or herself, or multiple persons including himself or herself and it is desirable that collection of audio be performed emphasizing sound in the shooting direction.

For example, in cameras outfitted with a microphone (hereinafter, referred to as mic) in the display part, the method has been proposed of controlling fluctuations in sound that is recorded corresponding to the direction of the mic at the time of shooting through weighting of the audio that the mic has collected according to the mic direction (either the shooting direction or the opposite direction).

In the case of taking a self-shooting, various shooting methods can be used, such as, for example, a method of shooting by affixing a video camera to a tripod or a method of shooting in which the operator holds the video camera and faces the imaging part toward himself or herself. In other words, the condition of the subject (operator) with respect to the video camera (for example, the distance between the video camera and the subject) can be varied. However, with the above-noted methods, weighting according only to the direction of the mic is performed on the audio that the mic has collected. For that reason, depending on the condition of the subject with respect to the video camera, when a self-shooting is taken, there may be cases in which audio in keeping with the operator's intentions cannot be obtained.

Additionally, a method has been proposed in which, for example, recording of audio in keeping with the intentions of the operator is performed by changing the directionality of the mic on the basis of the size of specified items that are included in the shooting area and engaging in audio processing such as enhancing a particular frequency band of the audio collected.

With this method, it is possible to correct the audio that the mic has collected according to the size of the subject included in the shooting area and according to the zoom factor. However, in this method, the same audio processing is performed regardless of whether it is a self-shooting or whether it is an ordinary shooting. For that reason, there may be instances in which audio in keeping with operator's intentions cannot be obtained when a self-shooting is taken.

SUMMARY OF THE INVENTION

An imaging device according to the present invention includes:
at least one imaging part to obtain images through shooting;
at least one sound-collection part to obtain audio by collecting it along with the shooting of the imaging part;
a specified-subject detection part to detect a specified subject from within the image;
at least one display part to display the image;
a direction-relationship detection part to detect the relative relationship of the direction in which the display part displays the image and the direction in which the imaging part shoots;
an audio-correction part to perform audio-correction processing on the audio obtained through the sound-collection part according to the detection results for a specified subject by the specified-subject detection part and the relationship that is detected by the direction-relationship detection part.

A playback device according to the present invention includes:
a playback part to play back the image obtained through shooting and the audio that is collected and obtained together with the shooting of the image;
a direction-relationship detection part that detects the relative relationship between the direction in which the image has been shot and the direction in which the image was displayed at the time of shooting;
an audio-correction part that implements audio-correction processing on the audio that the playback part generates according to the specified subject in the image and the relationship detected by the direction-relationship detection part.

BRIEF DESCRIPTION OF THE DRAWINGS

FIG. 1 is a block diagram that shows an outline of the configuration of the imaging device according to an Example 1 of the present invention.

DETAILED DESCRIPTION OF PREFERRED EMBODIMENTS

Figure 2B:
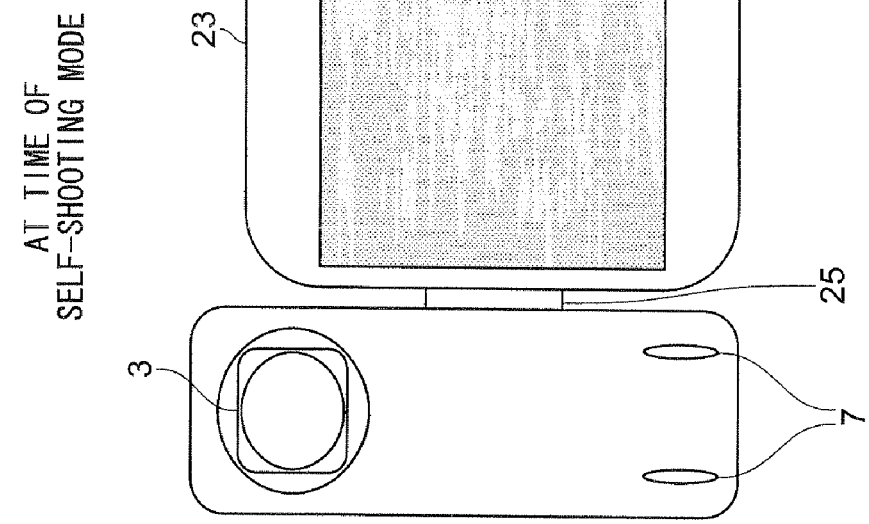
FIG. 2B is an illustration showing an exterior view of the imaging device according to the Example 1 of the present invention.

Significance and effects of the present invention become apparent from the following description of an embodiment. Note that, the following embodiment is merely one of the embodiments of the present invention, and meanings of terms used to describe the present invention and components thereof are not limited to those described in the following embodiment.

Example 1

An explanation will be made with reference to diagrams of an embodiment that have implemented present invention in imaging devices, including digital cameras and digital video cameras that allow for recording and playback of audio and images. These imaging devices may be devices that can take video or devices that can take still images.

(Configuration of the Imaging Device)

FIG. 1 is a block diagram that shows an outline of the internal configuration of the imaging device according to an Example 1 of the present invention. The imaging device of FIG. 1 is equipped with an image sensor (solid-state imaging element) 1 such as a charge coupled device (CCD) or complementary metal oxide semiconductor (CMOS) that converts incident light to an electric signal; a lens part 3 that has a zoom lens to form an optical image of the subject on the image sensor 1, a motor to change the focus distance of the zoom lens, that is to say, the optical zoom factor, and a motor to match the focus of the zoom lens to the subject; an analog front end (AFE) 5 to convert the analog image signals that are output from image sensor 1 into digital image signals; stereo mic 7, which consists of mic 7L and 7R that independently collect sound that arrives and convert it to analog audio signals; image-processing part 9 to implement varied image processing, including tone correction on digital image signals that are output from AFE 5; audio-processing part 11 to convert analog audio signals output from stereo mic 7 to digital audio signals and engage in audio-correction processing according to the condition at the time of shooting; compression-processing part 13 to perform compression-coded processing such as Joint Photographic Experts Group (JPEG) on image signals from image-processing part 9 in cases of shooting a still image and such as Moving Picture Experts Group (MPEG) on image signals output from image-processing part 9 and audio signals from audio-processing part 11 in the case of shooting video; driver part 49, which records to external memory 47 such as Secure Digital (SD) memory cards compression-coded signals that have been compression coded by compression-processing part 13; decompression-processing part 17 to decompress and decode compression-coded signals read out from external memory 47 by driver part 49; video-output circuit part 19 to convert image signals decoded and obtained through decompression processing part 17 to analog signals; video-output terminal 21 to output signals converted by video-output circuit part 19; display part 23, which has a liquid crystal display (LCD) or other monitor, to perform display of images on the basis of signals from video-output circuit part 19; rotation part 25 to rotate display part 23; audio-output circuit part 29 to convert to analog signals audio signals decoded and obtained through decompression-processing part 17; audio-output terminal 31 to output signals converted by audio-output circuit part 29; speaker part 33 to reproduce and output sound on the basis of audio signals from audio-output circuit part 29; timing generator (TG) 35 to output timing control signals for the purpose of matching the operation timing of various blocks; central processing unit (CPU) 37 to control drive operation within the imaging device overall; memory 39 to record various programs for the purpose of various operations and to engage in temporary storage of data at the time of program execution; manipulation part 41, where instructions are input by operators and including a button for the purpose of inputting instructions on the starting and stopping of recording; bus line 43 for the purpose of engaging in exchange of data between CPU 37 and various blocks; and bus line 45 for the purpose of engaging in exchange of data between memory 39 and various blocks. Note that CPU 37 may control focus and diaphragm by driving the motor of lens part 3 according to the image signal detected by image processing part 9.

(Basic Operation of the Imaging Device: During Video Shooting and Playback)

Figure 2A:
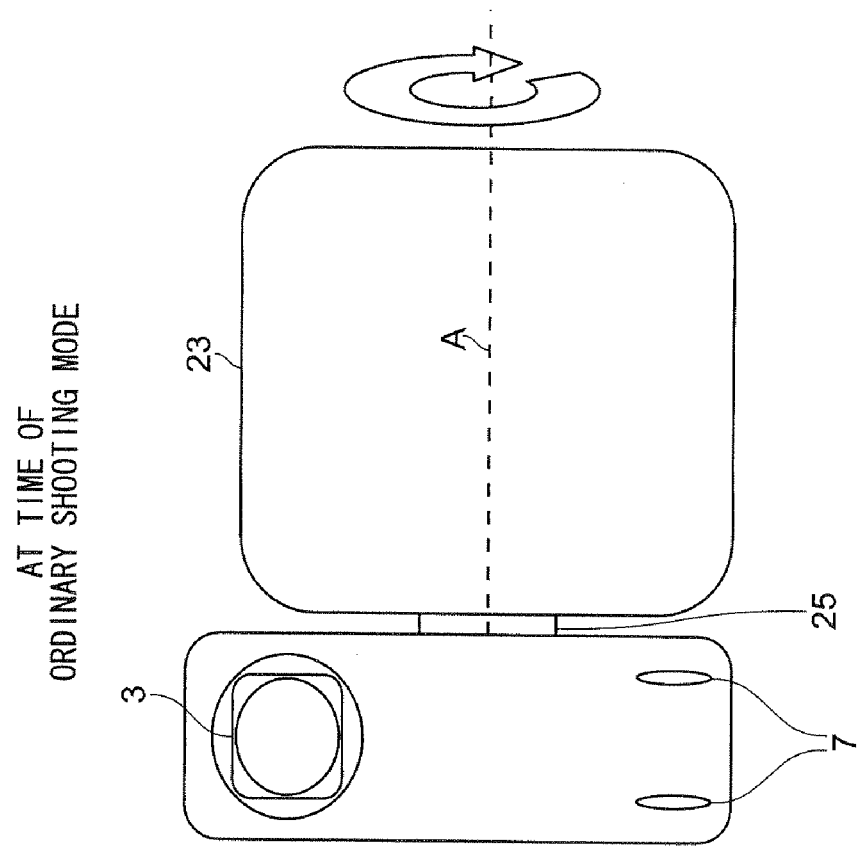
FIG. 2A is an illustration showing an outline an external view of the imaging device according to the Example 1 of the present invention.

Next, we will explain the basic operation of this imaging device at the time of video shooting. FIG. 2A and FIG. 2B are illustrations showing an outline an external view of the imaging device according to the Example 1 of the present invention. This imaging device has two types of shooting modes of ordinary shooting mode and self-shooting mode.

When engaging in video shooting in the ordinary shooting mode, the direction that the monitor of display part 23 (gray part of FIG. 2B) faces (direction that displays the image. In FIG. 2A, the paper-surface far direction. Hereinafter, to be noted as the display direction.) and the direction of that lens part 3 faces (the shooting direction. The paper-surface near direction of FIG. 2A. Hereinafter to be noted as the shooting direction.) are in opposite directions (the condition in which the display direction and the shooting direction are separated by a certain amount (for example, an angle) or greater and the same will be true hereafter.).

On the other hand, in the case in which a video is being shot in the self-shooting mode, as shown in FIG. 2B, the display direction (paper-surface near direction) and the shooting direction (paper-surface near direction) are roughly the same direction (the condition in which the display direction and the shooting direction are closer than a set amount (for example, angle). The same will apply below.).

Figure 3:
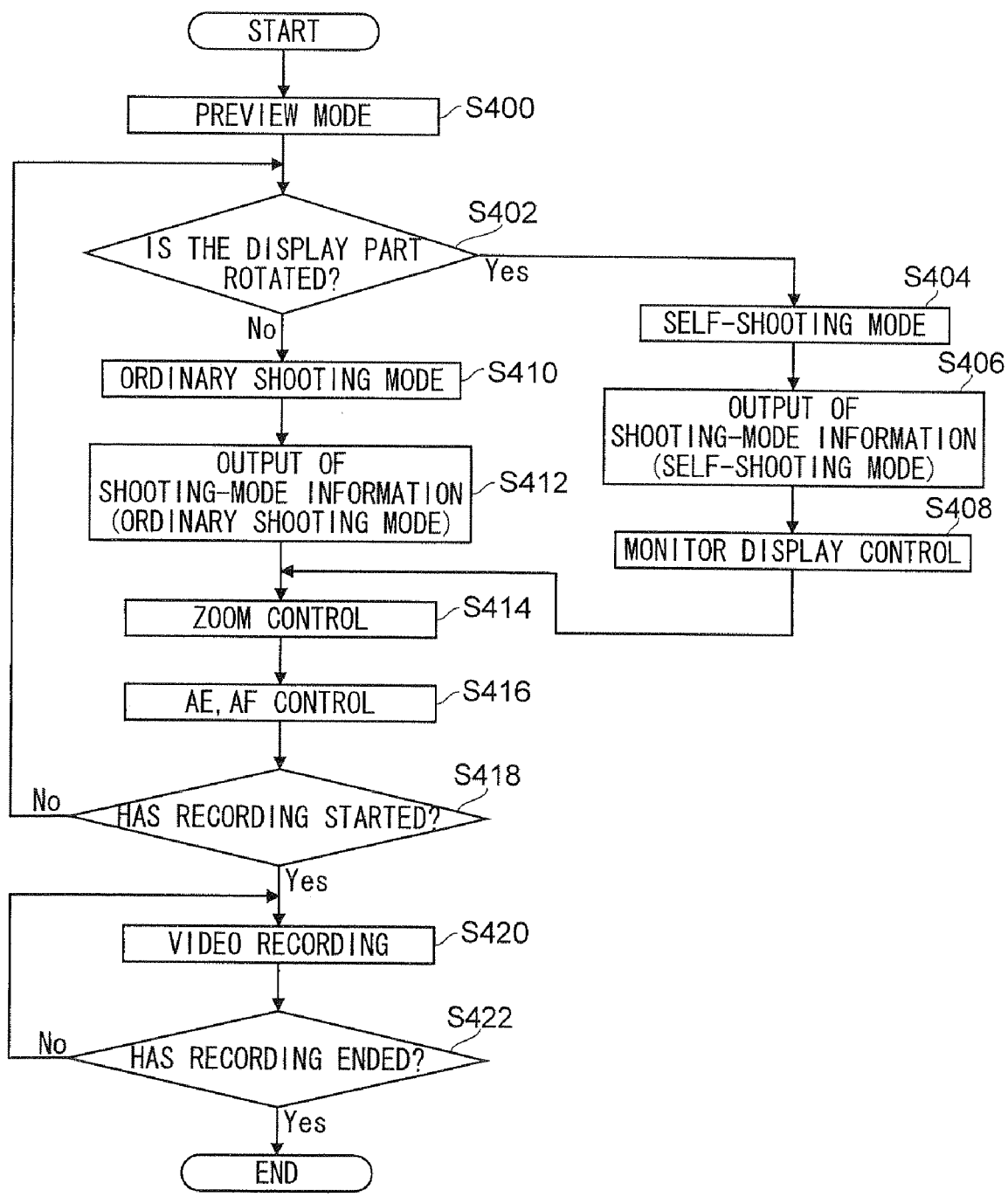
FIG. 3 is a flow chart showing an outline of the basic operation at the time of video shooting of the imaging device according to the Example 1 of the present invention.
Figure 4:
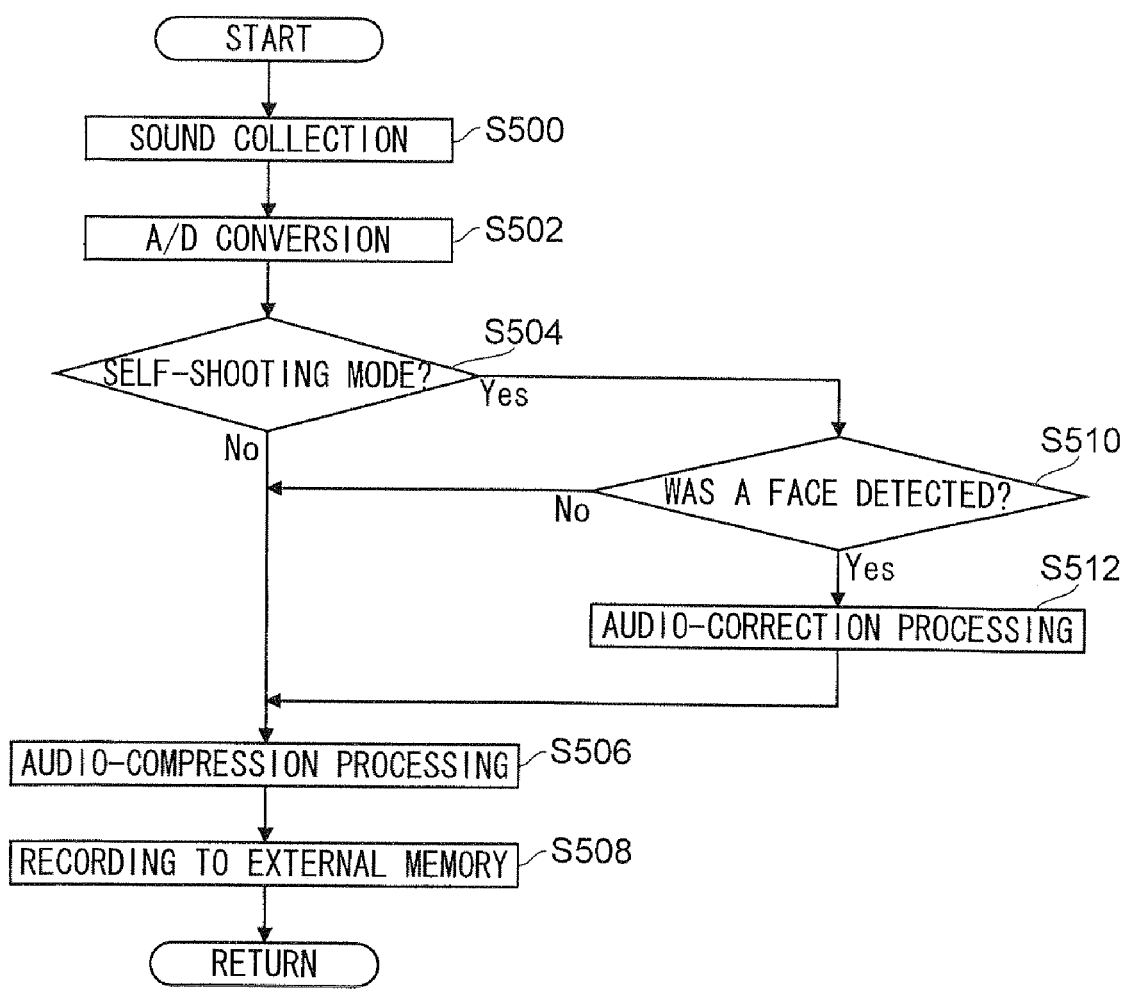
FIG. 4 is a flow chart showing an outline of the basic operation of the video recording processing at the time of video shooting of the imaging device according to the Example 1 of the present invention.

FIG. 3 and FIG. 4 are flow charts that show outlines of the basic operation at the time of video shooting of this imaging device. First, the operator sets the imaging device to video-shooting-use and turns the power source ON, and then the drive mode of the image device, in other words, the drive mode of image sensor 1 is set to the preview mode (S40). In the preview mode, the image signal, which is an analog signal that is obtained through the photoelectric conversion of image sensor 1, is converted to a digital signal in AFE 5 and image processing is implemented through image-processing part 9 and is displayed on display part 23.

Figure 5:
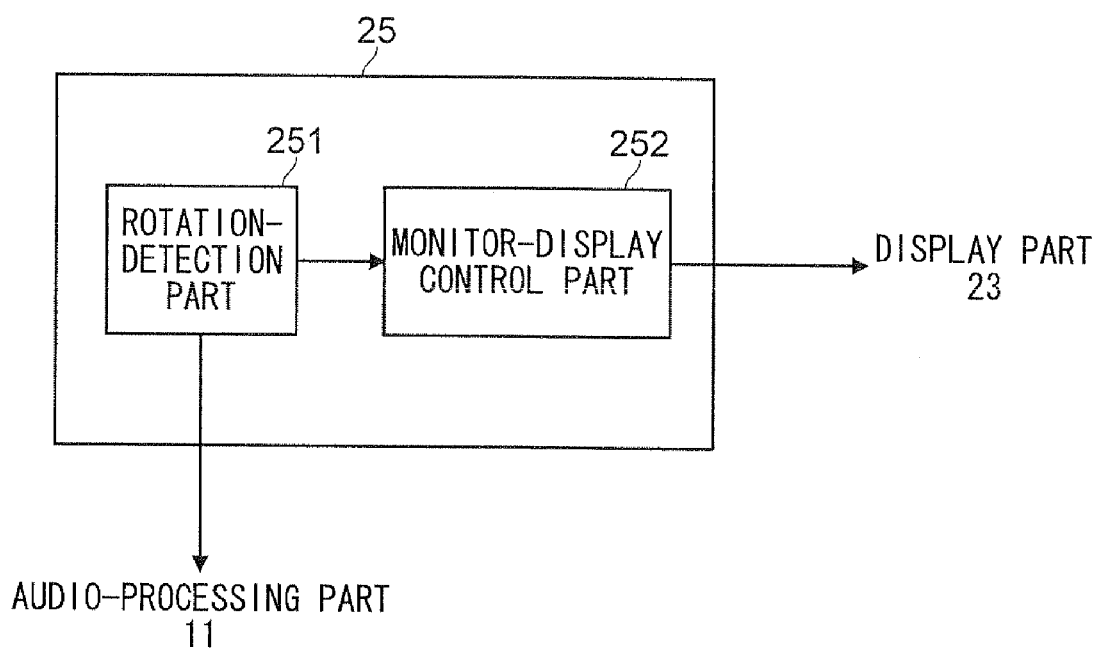
FIG. 5 is a block diagram showing an outline of the internal configuration of rotation part 25 of the imaging device according to the Example 1 of the present invention.

FIG. 5 is a block diagram showing the internal structure of rotation part 25. Rotation part 25 is provided with rotation-detection part 251 to detect the rotation of display part 23 and monitor-display control part 252 to engage in display control of the monitor according to the rotation angle of display part 23. Rotation-detection part 251 can, for example, be realized by using the lever-style micro-switch disclosed in Public Patent Disclosure Bulletin H6-302169. In addition, in rotation part 25, a rotary encoder may be provided for the purpose of detecting the rotation angle of display part 23 and to make it such that it detects the rotation angle of display part 23 successively and when the rotation angle exceeds a set value, it is determined that display part 23 has been rotated. In the preview mode, when display part 23 is rotated via rotation part 25 and, as shown in FIG. 2B, it is oriented in roughly the same direction as the direction in which lens part 3 faces (Yes in S402), the self-shooting mode is selected (S404) and shooting-mode information indicating that the self-shooting mode has been selected is output to audio-processing part 11 (S406).

In the case of the self-shooting mode, the monitor of display part 23 displays, consequently, an image in which the upward and downward directions and left and right directions are reversed in comparison to the ordinary shooting mode. For that reason, the monitor-display control part 252 controls the display part 23 such that the upward and downward directions and right and left directions of the image for preview use are, respectively, displayed reversed on the monitor of display part 23 (S408). Note that in the case in which the self-shooting mode is selected, information indicating that the shooting mode has been set as the self-shooting mode is displayed on display part 23 and information indicating the content of the audio-correction processing that is to be implemented on the sound collected through stereo mic 7 is also displayed. The aforementioned information is information, for example, indicating the recording method, such as stereo recording or monaural recording, and information indicating the content of the speech enhancement processing. The display of this information may be in characters or may be in objects, such as icons. In addition, it is acceptable to make it such that the operator can set at his or her own discretion the required rotation angle of display part 23 while the self-shooting mode is selected. When display part 23 is not rotated (No in S402), it is assumed that the ordinary shooting mode is selected (S410) and shooting-mode information indicating that the ordinary shooting mode is selected is output to audio-processing part 11 (S412). At this time, information indicating that the ordinary shooting mode is set may be displayed on display part 23.

Next, the operator sets the zoom factor of the optical zoom such that the desired shooting area will result for the subject to be shot (in the case of the self-shooting mode, the operator) (S414). At that point, on the basis of the image signal that has been input to image-processing part 9, optimal automatic exposure (AE) and auto focus (AF) are performed by controlling the lens part 3 through CPU 37 (S416).

Thereafter, video-recording processing (S420) is implemented when the record start button of manipulation part 41 is pressed and instruction is given to perform recording operations (Yes in S418). Thereafter, video-recording processing is repeated until the recording stop button (which may also be the same button as the recording start button) is pressed on manipulation part 41 (Yes in S422).

FIG. 4 is a flowchart showing the sound-collection processing operation during video recording.

The audio (S500) that has been collected through stereo mic 7 is output to audio-processing part 11 as analog audio signals and it is converted to digital audio signals through A/D conversion (S502). In the case of shooting in the ordinary shooting mode (No in S504), the digital audio signals that have undergone A/D conversion are output to the compression-processing part 13 and they are compression coded (S506) on the basis of a compression coding method (for example, MP3: MPEG-1/2 Audio Layer-3 method) and the signals are recorded to external memory 47 (S508) via driver part 49 along with the video that has been taken.

In the case of shooting in the self-shooting mode (Yes in S504), when a face is detected in the shooting area (Yes in S510), audio-correction processing (S512) is implemented on the digital audio signal according to factors such as the location of the face detected, the size, and the zoom factor of lens part 3.

At this time, along with the audio signals on which audio-correction processing has been implemented, audio signals on which audio-correction processing has not been implemented, zoom factor information at the point at which the concerned audio signals were obtained as an index, shooting-mode information (can be interpreted as information that displays the rotation state of rotation part 25), and the like, may be recorded. In addition, in the flow chart shown in FIG. 3, it is not possible to change the shooting mode during video recording, but it is acceptable to make it such that switching between the ordinary shooting mode and the self-shooting mode during recording is possible. In that case, it is acceptable to make it such that at each prescribed time (for example, with each single frame), the rotation state of the display part 23 is detected and the shooting mode can be changed in response to those detection results.

When imaging operations are performed in this manner, a timing control signal is assigned by TG 35 to AFE 5, image-processing part 9, audio-processing part 11, compression-processing part 13, and decompression-processing part 17 and an operation is performed in which the imaging operations for each single frame are synchronized through image sensor 1.

In addition, when instruction is given through manipulation part 41 for the playback of video that is recorded to external memory 47, the compressed signals that are recorded to external memory 47 are read out by driver part 49 and are provided to decompression-processing part 17. In decompression-processing part 17, decompression decoding is performed on the basis of the compression-coding method, for example MPEG, and image signals and audio signals are obtained. Image signals are provided to display part 23 and images are played back, and along with this, audio signals are provided to speaker 33 via audio-output circuit 29 and audio is played back. Through this, video is replayed together with audio on the basis of compressed signals that are recorded to external memory 47.

(Face Detection Processing)

Here, we will explain the face-detection processing of this imaging device. Image-processing part 9 is provided with face-detection device 91 and it is possible to detect the face of a person from the image signals that have been input. Below, we will explain the configuration and operation of the face-detection device 91.

Figure 6:
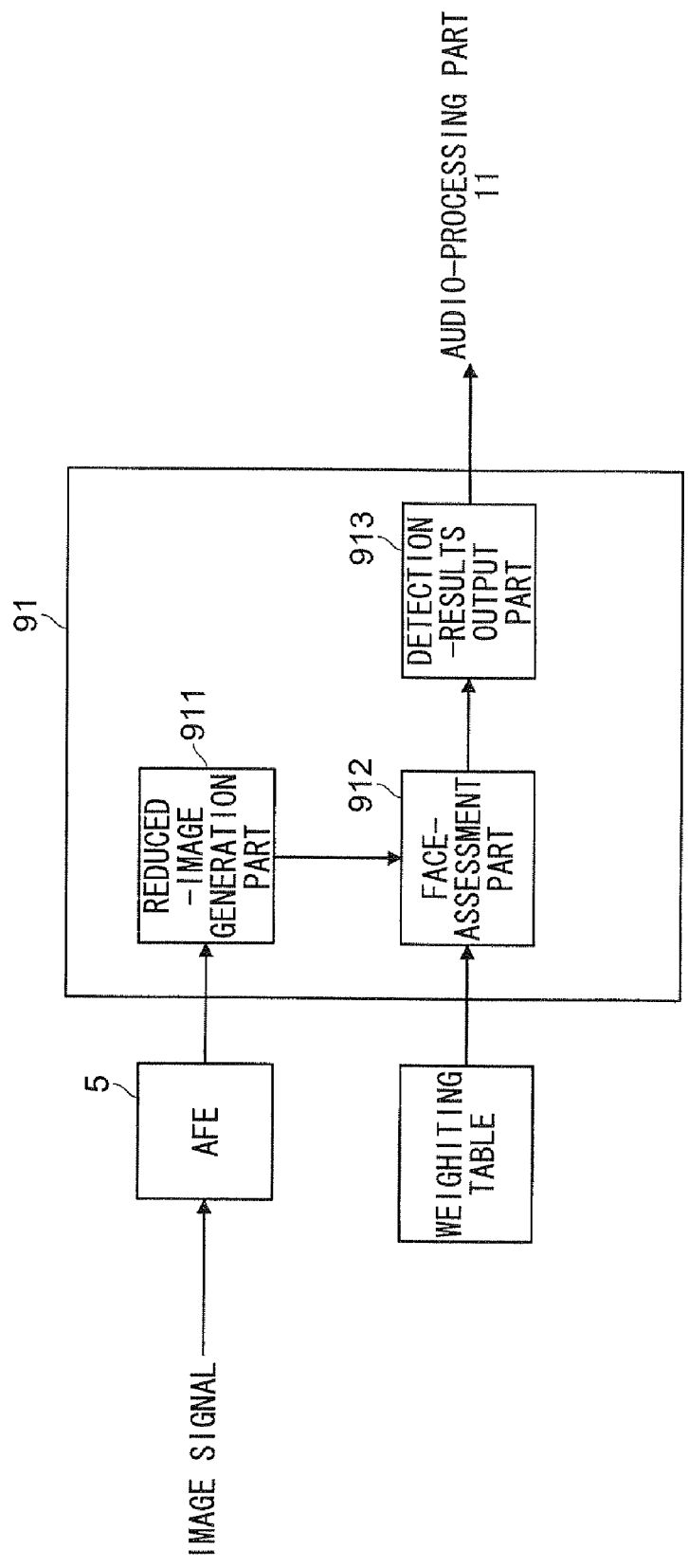
FIG. 6 is a block diagram showing an outline of the configuration of a face-detection device.

FIG. 6 is a block diagram showing an outline of the configuration of face-detection device 91. Face-detection device 91 is provided with reduced-image generation part 911, which will generate 1 or multiple reduced images on the basis of image signals obtained through AFE 5; face-assessment part 912, which will determine whether or not a face exists in the input image, using various hierarchical images composed from the input image and its reduced images and a face-detection-use weighting table that is recorded to memory 18; and detection-results output part 913, which will output the detection results of face-assessment part 912. In the case in which a face has been detected, detection-results output part 913 will output the size and the location and the distance from lens part 3 to the face, estimated from the size of the face, taking the input image of the face that has been detected as the standard.

In addition, the weighting table that has been recorded to memory 18 defines through types of edge characteristic images and row numbers and column numbers of various pixels of edge characteristic images, the pixel locations of the various edge characteristic images (for example, horizontal edge images and vertical edge images) of the same size as the assessment area used to detect a face from the shooting area. This type of weighting table was required for a large instructor sample (face and non-face sample images). This type of weighting table can be made, for example, using the known learning method called Adaboost (Yoav Freund, Robert E. Schapire, "A decision-theoretic generalization of on-line learning and an application to boosting", European Conference on Computational Learning Theory, Sep. 20, 1995).

Note that Adaboost is one applicable boosting learning method and it is a learning method to realize a high-precision classifier by making multiple individual selections of weak classifiers that are effective in classification from among multiple weak classifier candidates on the basis of a large-volume instructor sample, and weighting and integrating those. Here, a weak classifier refers to a classifier that has higher discrimination capability compared to complete chance, but does not have high enough precision to provide sufficient accuracy. When selecting a weak classifier, in cases in which there is a weak classifier that has already been selected, selection is made of the weak classifier having the highest effect from among the remaining weak classifiers candidates by weighting learning with respect to the instructor sample where there has been incorrect identification by weak classifiers already selected.

Figure 7:
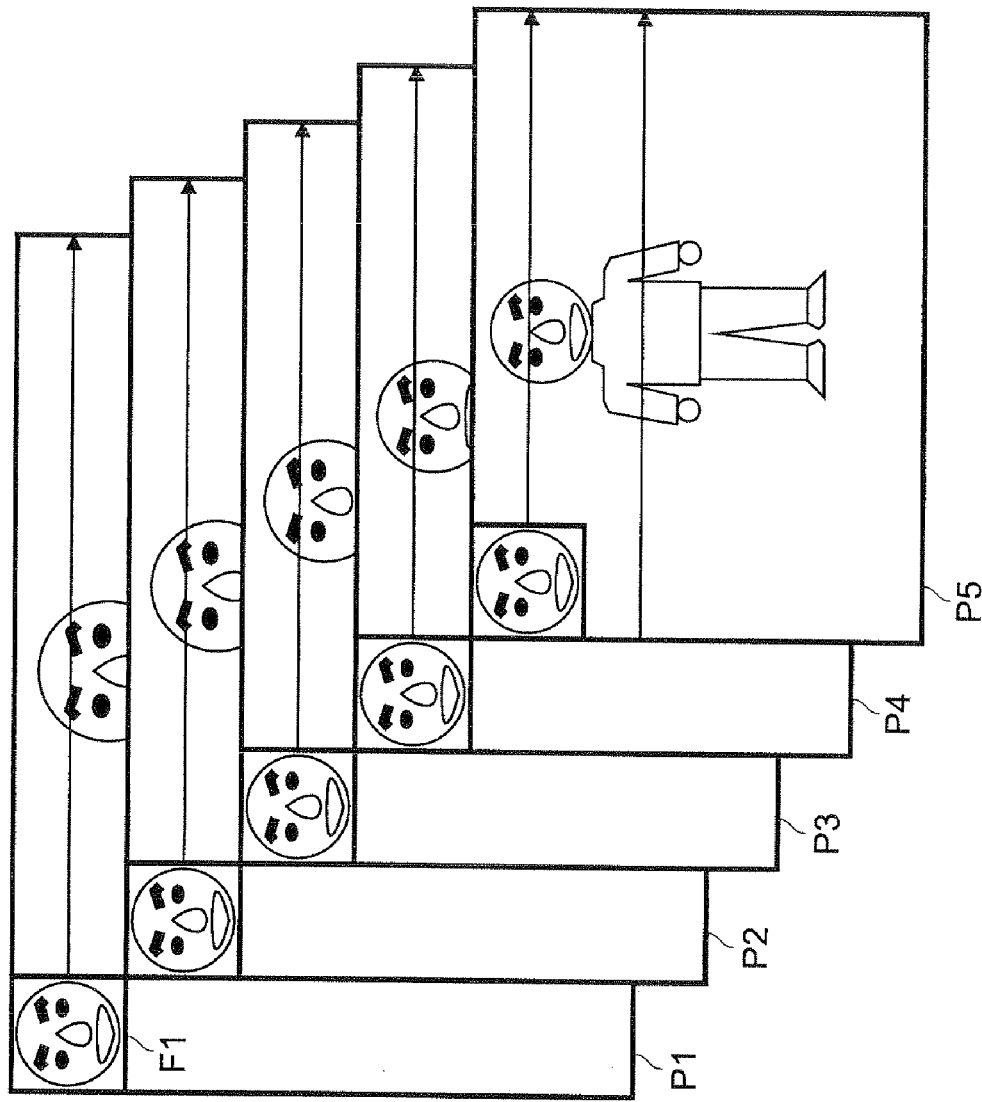
FIG. 7 is an illustration showing an example of a hierarchical image obtained through the reduced-image generation part.

FIG. 7 is an example of a hierarchical image obtained through reduced-image generating part 911. A hierarchical image consists of multiple images in which images that have been obtained by an imaging device have been reduced according to a selected reduction factor R ($0<R<1$, and ideally, a value close to 1 such as 0.8 or 0.9). In FIG. 7, P1 shows the input image and P2-P5 show reduced images that have, respectively, been reduced according to R factor, $R^2$ factor, $R^3$ factor, and $R^4$ factor. F1 shows the assessment area. The assessment area is set at, for example, 24 pixels vertically and 24 pixels horizontally. The size of the assessment area is the same for the input image and in its reduced images. The face detection processing is conducted using multiple edge characteristic images corresponding to the assessment region that has been set in the various hierarchical images and using a weighting table. In this example, detection of a face image that matches the assessment area is made by conducting pattern matching by moving from left to right over the assessment area on top of the hierarchical images and conducting scanning in the horizontal direction, facing from the top to the bottom of the image. However, the scanning order is not limited to this. Multiple reduced images P2-P5 are generated in addition to input image P1 in order to detect multiple faces with different sizes using 1 type of weighting table only.

Figure 8:
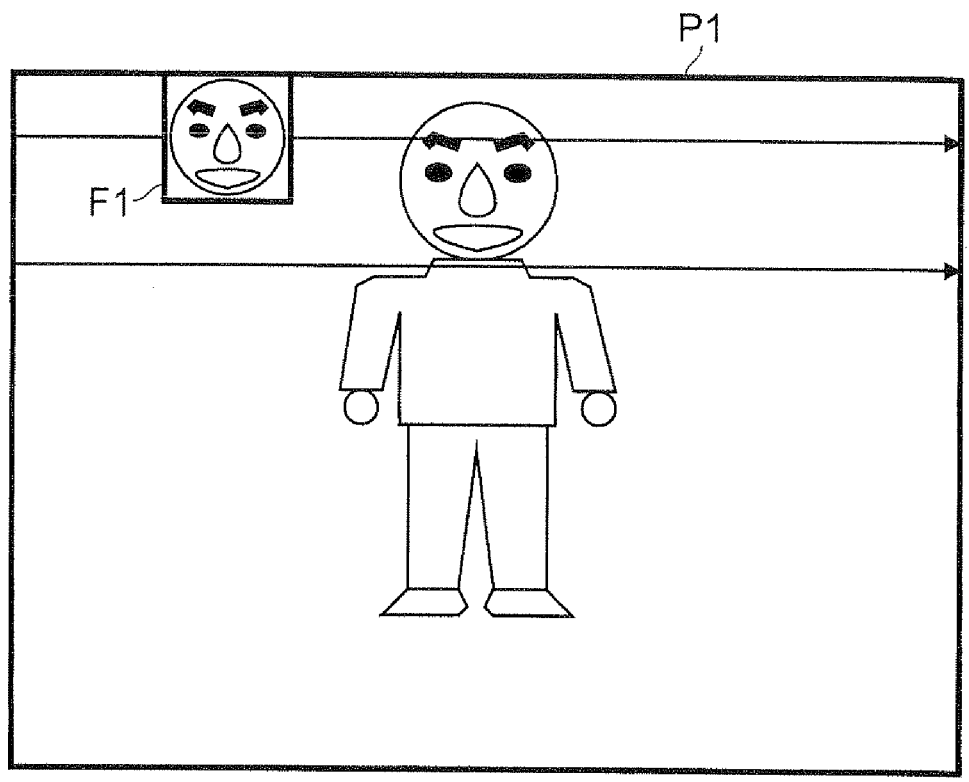
FIG. 8 is an illustration showing the processing operations of face-detection processing.

FIG. 8 is a diagram for the purpose of explaining face-detection processing. The face-detection processing through face-assessment part 912 is conducted on various hierarchical images, but the processing method is the same and thus here, we will provide an explanation only of the face-detection processing that is conducted on input image P1. FIG. 8 shows input image P1 and assessment region F1, which is established in the input image.

The face-detection processing that is conducted on each hierarchical image is conducted using images corresponding to the assessment area established in the image and a weighting table. The face-detection processing consists of multiple assessment steps, moving from rough assessments to finer assessments in succession and in cases in which no face is detected at a certain assessment step, no further progression to the next assessment step will be made and the decision will be made that no face exists in the concerned assessment area. Only in cases in which a face has been detected in all the assessment steps will a decision be made that a face exists in the concerned assessment area and there will be a move to the decision for the next assessment area by scanning the assessment area. When a face is detected, it is possible to estimate the size of the face, taking the input image as the standard, and the distance from lens 3 to the face depending on whether any of the hierarchical images were used. In this manner, the location and size of the face that has been detected and the distance to the person having that face are output by detection-results output part 913. Note that this type of face-detection processing has been disclosed in detail in Public Patent Disclosure Bulletin 2007-257358.

(Audio-Correction Processing)

Figure 9:
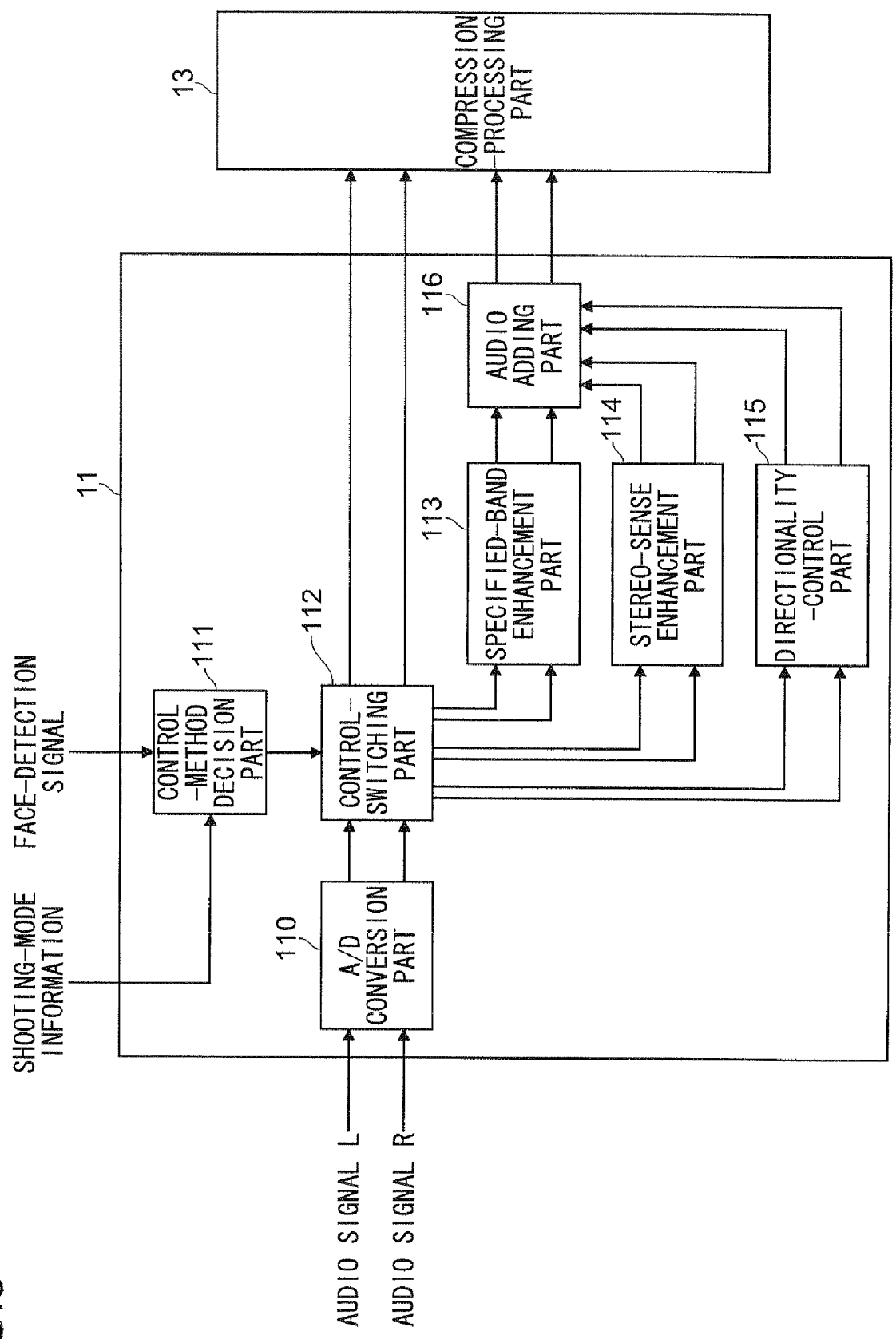
FIG. 9 is a block diagram showing an outline of the internal configuration of audio processing part 11 of the imaging device according to the Example 1 of the present invention.

Next, we will explain the audio-correction processing of this example. FIG. 9 is a block diagram showing the configuration of the audio-processing part 11 of this example.

Audio-processing part 11 as shown in FIG. 9, is provided with an A/D conversion part 110 that will convert audio signal L and audio signal R, which are analog audio signals that are output from mic 7L and 7R, into digital audio signals; control-method decision part 111, which will decide on the necessity and the content of audio-correction processing, receiving face detection signals from image-processing part 9 and shooting-mode information from rotation-detection part 251; control-switching part 112, which receives signals indicating the need and content of audio-correction processing output from control-method decision part 111 and switches the output destination of the two audio signals that are output from mic 7L and 7R; specified-band enhancement part 113, which enhances specified frequency bands of the two audio signals that are output from control-switching part 112; stereo-sense enhancement part 114, which enhances the stereo sense of the two audio signals that are output from control-switching part 112; directionality-control part 115, which enhances the sound that arrives from a specified direction, among the two audio signals that are output from control-switching part 112; and audio-adding part 116, which adds at a specified ratio (for example, 1:1) each of audio signal L and R that have each been processed by stereo-sense enhancement part 114 and directionality control part 115.

Figure 10:
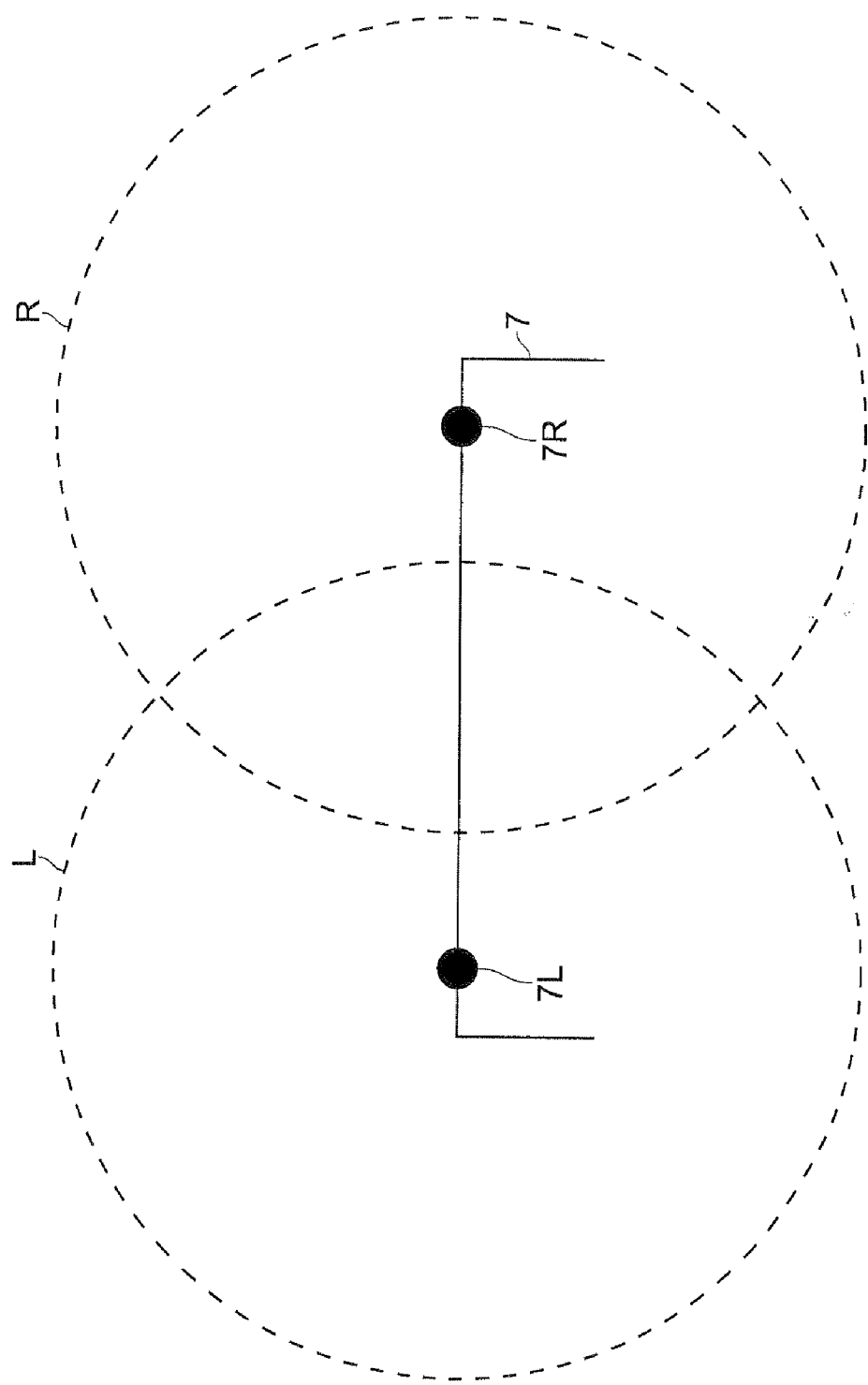
FIG. 10 is a schematic diagram showing the sound-collection orientation of the stereo mic of the imaging device according to the Example 1 of the present invention.

FIG. 10 is a schematic diagram showing the sound-collection directionality of stereo mic 7. Mic 7L and 7R are each omnidirectional (nondirectional) mics. The L and the R shown in FIG. 10 each represent the sound-collection directionality of mic 7L and 7R. Omnidirectional mics have the characteristic of responding only to the size of the sound that arrives from the periphery of the mic, regardless of the orientation of the mic or the angle. For that reason, all sound that arrives will be collected according its size (volume).

With the start of the audio-correction processing, the control-method decision part 111 refers to the shooting-mode information that is output from rotation-detection part 251 and determines whether or not the self-shooting mode is selected. In addition, it determines whether or not a face-detection signal has been output from image-processing part 9.

In the case in which the ordinary shooting mode has been selected or in the case in which the self-shooting mode has been selected and the face-detection signal from image-processing part 9 has not been output, control-method decision part 111 will output to control-switching part 112 a command not to engage in audio-correction processing for the sound collected and control-switching part 112 will output to compression-processing part 13, the audio signal L and R that have been output by A/D conversion part 110.

When the self-shooting mode is selected and a face-detection signal is output from image-processing part 9, a directionality control order will be output according to the location in the image of the face that has been detected through face-detection processing and according to the size within the image.

In the case in which multiple face-detection signals are output from image-processing part 9 (to put it in other words, the faces of multiple persons have been detected through the face-detection processing), directionality control will be implemented so as to enhance the sound that comes from the direction where the person is that has the greatest character size, as it is assumed that the operator wants to shoot the person with the greatest character size. This directionality control will be described later. The person who is being most prominently shot in the image can be determined by whether a face has been detected in any of the hierarchical images in face-detection device 91. Specifically, in the face-detection method of this example, as stated above, the face of a person is detected through pattern matching using the various hierarchical images and the assessment area. The size of the assessment area even in cases in which pattern matching is conducted on any of the hierarchical images is the same and thus the higher the degree of reduction of the hierarchical image where the face is detected, the larger the face in the shot image.

In addition, in cases in which the face of a person that a operator wants to shoot is recorded to external memory 47 in advance and is registered as a subject for shooting and verification is made as at the time of face-detection processing as to whether or not a person who is the same as the person included in the concerned still image is included in the image shot and a person who is a match is included in the shot image, the sound that arrives from the direction in which that person exists may be enhanced. It will be possible for a operator to appropriately switch the priority prior to shooting or during shooting as to whether directionality control is to be implemented for the sound that arrives from the direction where the person with the largest character size exists or whether directionality control is to be implemented for the sound that arrives from the direction where a person who is the subject of a photograph registered in advance exists. In addition, it is also acceptable to implement directionality control in both directions.

In cases in which a face that has been detected through face-detection processing is larger than a specified size (for example, the area that the face occupies in the image is 30% or 50%), it is assumed that the operator will want to collect the voice emanating chiefly from said person and thus, control-method decision part 111 will output to control-switching part 112 a command to implement enhancement processing of the audio band corresponding to that person's voice (for example, 800-1200 Hz) within the sound collected from stereo mic 7 and to implement directionality control with respect to the sound that arrives from the direction where the person is that appears in the image.

The control-switching part 112 outputs to specified-band enhancement part 113 and directionality-control part 115 audio signals L and R that have been output by the A/D conversion part 110. The specified-band enhancement part 113 and directionality-control part 115 implement, respectively, specified-band enhancement processing and directionality control for the audio signals that have been output and output to audio-adding part 116. Audio-adding part 116 adds the audio signals that have been output respectively by specified-band enhancement processing part 113 and directionality-control part 115 at a specified ratio (for example, a ratio of 1:1) and outputs to compression-processing part 13.

In addition, in cases in which the size of a person is under a prescribed size, it is assumed that the operator wants to collect sound of the person along with the ambience of the periphery and thus control-method decision part 111 outputs to control-switching part 112 an order to implement stereo-sense enhancement processing on the audio that has been collected from stereo mic 7 along with an order to implement directionality control on the sound that arrives from the direction where the person is that appears in the image.

Control-switching part 112 outputs to each the stereo-sense enhancement part 114 and directionality-control part 115 audio signals L an R that have been output from the A/D conversion part 110. The stereo-sense enhancement part 114 and the directionality-control part respectively implement the stereo-sense enhancement processing and directionality control on the audio signals that have been output and output to audio-adding part 116. Audio-adding part 116 adds the audio signals that have been output respectively by stereo-sense enhancement processing part 114 and directionality-control part 115 at a specified ratio (for example, a ratio of 1:1) and outputs such to compression-processing part 13.

Note that this example is configured such that audio signals on which processing has been implemented by specified-band enhancement part 113, stereo-sense enhancement part 114, and directionality-control part 115 are suitably added by audio-adding part 116 but, it is also acceptable, for example, to perform directionality control through directionality-control part 116 on audio signals on which processing has been implemented by specified-band enhancement part 113.

As noted above, it is possible to obtain audio in keeping with the operator's intent for the shooting by implementing on audio obtained along with images audio-correction processing according to the relationship between the display direction and the imaging direction (for example, shooting mode) and the condition of a specified subject in an image (for example, the location of the person and the size of the face).

(Regarding Stereo Processing)

Here, we will provide an explanation of a case of stereo processing for Example 1. Here, we will explain processing to enhance the sound in the two directions of left and right by using add-in-type directionality control.

Figure 11:
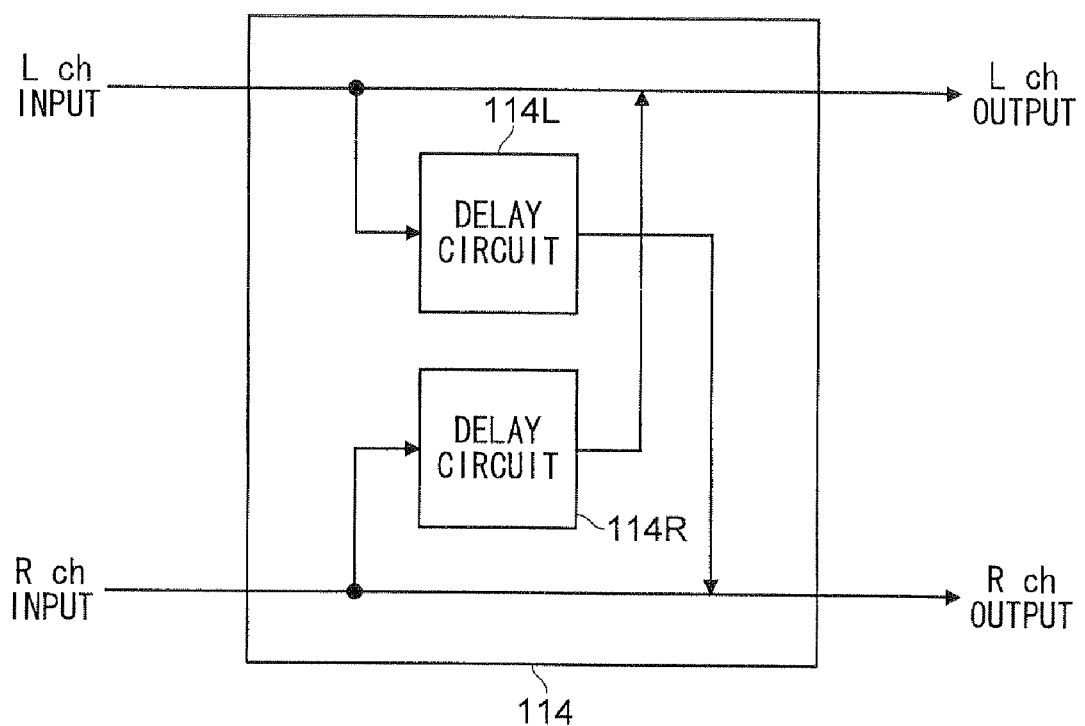
FIG. 11 is a block diagram showing an outline of the internal configuration of the stereo-sense enhancement part 114.

FIG. 11 is a block diagram that shows an outline of the internal configuration of the stereo-sense enhancement part 114 in this case. Stereo-sense enhancement part 114 is provided with delay circuit 114L, which delays the audio signal that is input from the left channel (L ch), and delay circuit 114R, which delays the audio signal that is input from the right channel (R ch), and it outputs the audio signal for the right channel by synthesizing the audio signal of the right channel as it was input and the audio signal of the left channel delayed by delay circuit 114L and outputs the audio signal for the left channel by synthesizing the audio signal of the left channel as it was input and the audio signal of the right channel delayed by delay circuit 114R.

Figure 12B:
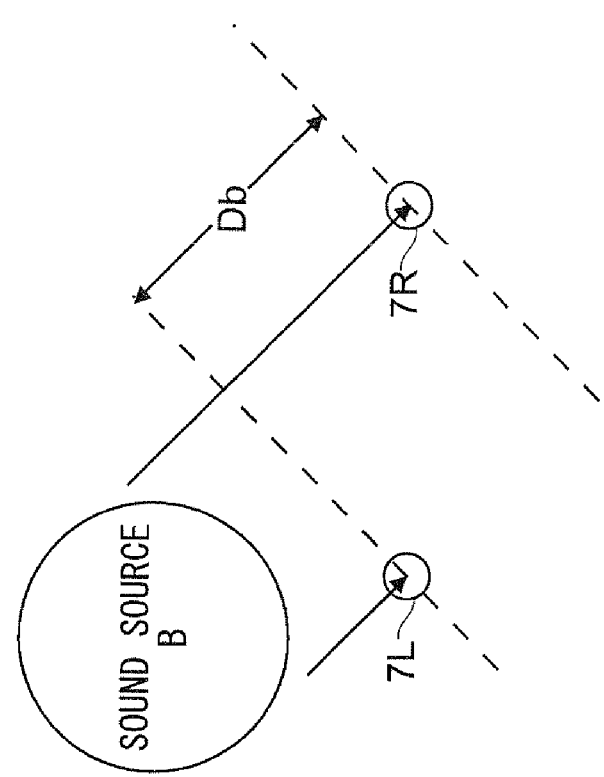
FIG. 12B is a schematic diagram showing the positional relationship of a mic and a sound source.
Figure 12A:
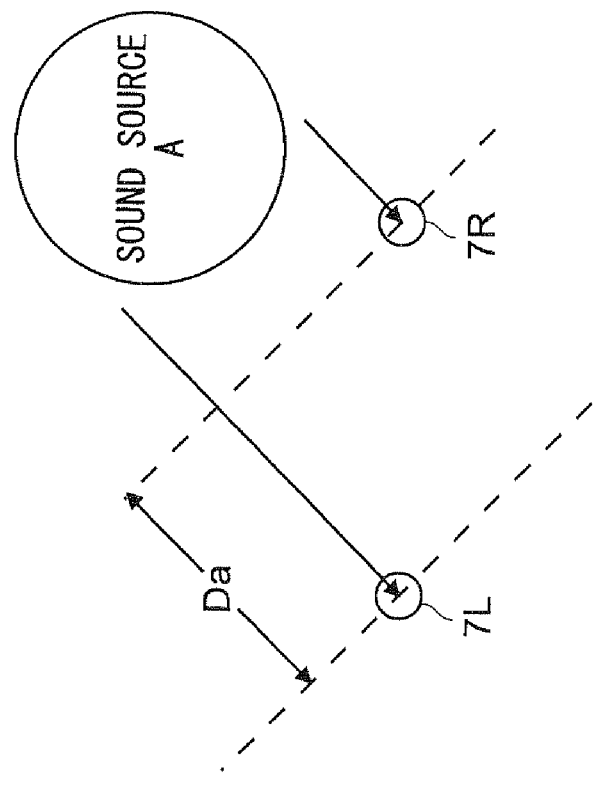
FIG. 12A is a schematic diagram showing the positional relationship of a mic and a sound source.

As shown in FIG. 12A, in the case in which sound arrives from sound source A on the right side with respect to the 2 mics 7L and 7R, until the sound arrives from the sound source to each mic 7L and 7R, they are out of step by the path-length difference Da only. In this case, when the audio signal of the right channel that has been collected by mic 7R, which is the closer to the sound source, is delayed by the equivalent of path-length difference Da by delay circuit 114R and is added to the audio signal of the left channel that has been collected by mic 7L, which is the further from the sound source, it enhances the sound that arrives from the direction of sound source A by being simultaneously added to the sound of the sound-source direction. On the other hand, when the audio signal that has been delayed is subtracted, it cancels out the sound that arrives from the direction of the sound source.

Note that as indicated in FIG. 12B, in the case in which sound arrives from sound source B on the left side with respect to the 2 mics 7L and 7R, when, with respect to the audio signal collected by mic 7L, a delay equivalent to path-length difference Db is applied through delay-circuit 114L and is added or subtracted to the audio signal collected by mic 7R, the sound that arrives from the direction of sound source B is either enhanced or canceled.

(Regarding Directionality-Control Processing)

Next, we will explain an example of directionality control in Example 1. Various methods have been proposed for directionality-control processing. The method consisting of the delay of an audio signal and of additive processing and subtractive processing, known as the additive type and subtractive type, which were explained in the stereo processing described above, is one such method and additionally, beam-forming using a microphone array and two-dimensional fan filtering are also methods. Here, we will explain the method of enhancing sound that comes from a specified direction on the basis of relative information between the audio signals detected from the 2 mics.

Figure 13:
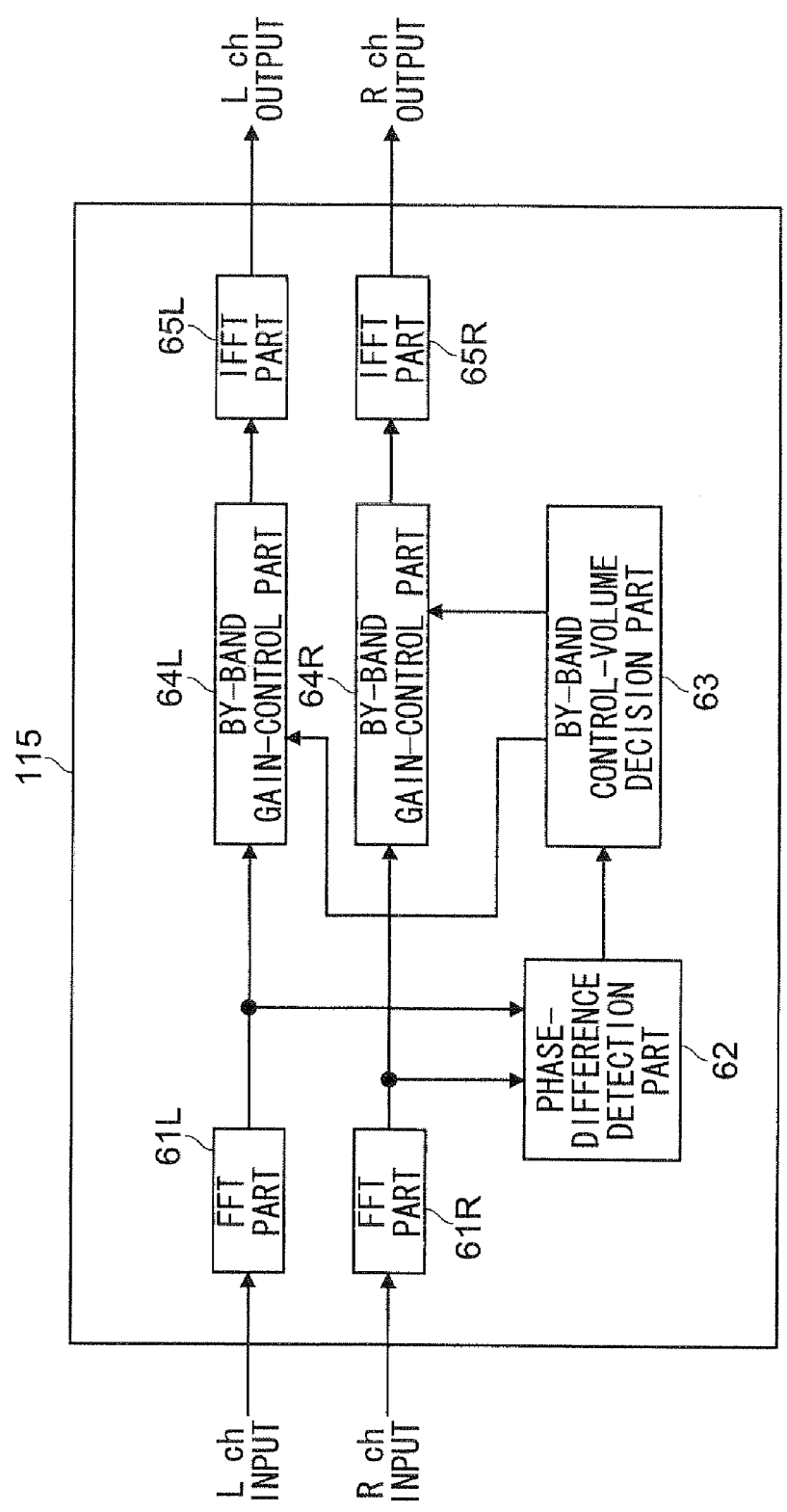
FIG. 13 is a block diagram showing an outline of the internal configuration of directionality control part 115.

FIG. 13 is a block diagram of directionality-control part 115, which makes it possible to use this method. As shown in FIG. 13, directionality-control part 115 is provided with 2 FFT parts 61L and 61R, which fast-Fourier transform (FFT) the audio signal of the right channel and the audio signal of the left channel independently; phase-difference detection part 62, which detects the phase difference of the right-channel audio signal and the left-channel audio signal that have been fast-Fourier transformed by FFT parts 61L and 61R; by-band control-volume decision part 63, which decides on the control volume of directionality by band from the phase-difference information that has been detected by phase-difference detection part 62; 2 by-band gain-control parts 64L and 64R, which independently gain control by band the fast-Fourier transformed right-channel audio signal and left-channel audio signal on the basis of the control volume decided upon by by-band control-volume decision part 663; and IFFT parts 65L and 65R, which inverse fast-Fourier transform (IFFT), respectively, the right-channel audio signal and left-channel audio signal, which have been gain-controlled by by-band gain-control parts 64L and 64R.

Figure 14:
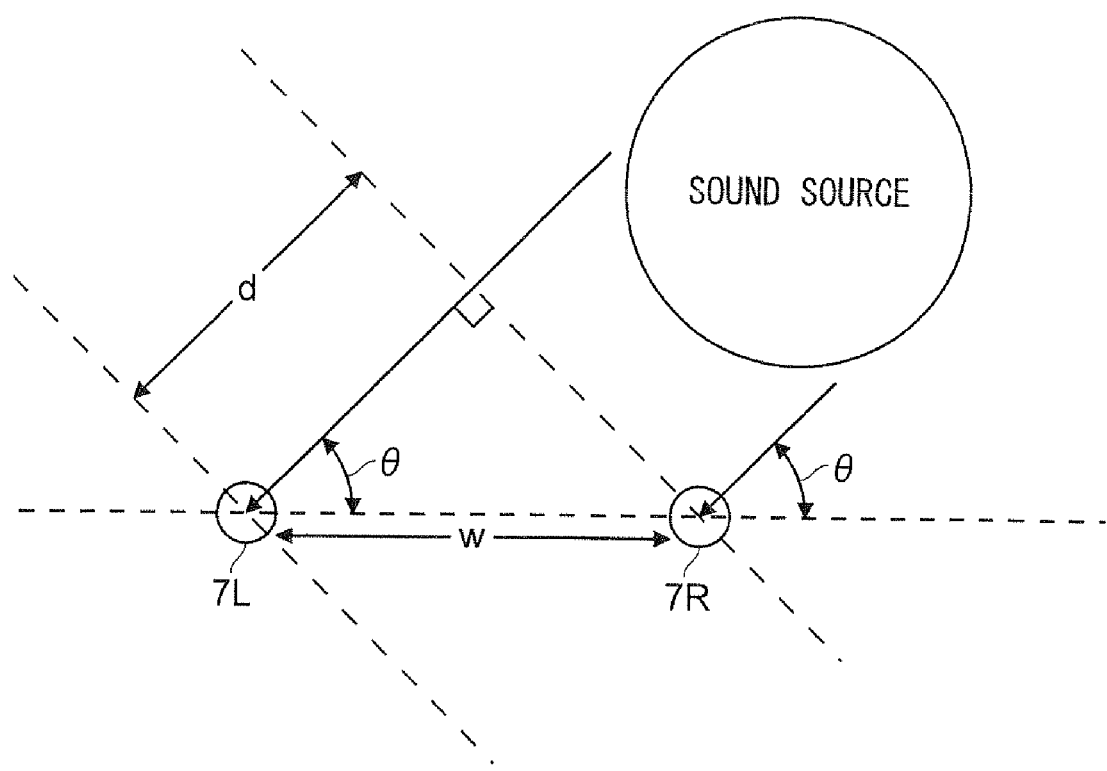
FIG. 14 is a schematic diagram showing the positional relationship between the mic and a sound source.

When the right-channel audio signal and the left-channel audio signal are input to FFT part 61L and 61R, they are fast-Fourier transformed and phase information is calculated by frequency band. As shown in FIG. 14, there is a time difference until sound reaches, respectively, mic 7L and 7R. By the phase-difference detection part 62, a calculation is made of the phase difference from the phase-difference information of the right-channel audio signal and the left-channel audio signal. The time difference until the sound arrives at, respectively, mic 7L and 7R can be derived from this phase difference. The time difference until the sound arrives, respectively, at mic 7L and 7R differs according to the arrival direction of the sound and thus, it is possible to specify the arrival direction of the sound from this time difference. Specifically, the path-length difference d is derived from said time difference and angle θ is derived from this path-length difference d and the installation interval w of mic 7L and 7R. It is possible to specify the arrival direction of the sound from this angle θ. By-band control-volume decision part 63 determines whether or not the arrival direction of the sound components calculated by phase-difference detection part 62 are in the direction taken as the target, for example, are in the direction of a certain subject in the image. The direction of the subject can be specified from the lens angle of lens part 3 (in other words, the range in the left-right direction where shooting is possible in the shooting direction) and the location where the subject is detected in the image. When a decision is made in by-band control-volume decision part 63 that they are sound components that have arrived from a direction other than the target (in other words, in cases in which the arrival direction of the sound and the location of the subject in the picture roughly correspond), the fast-Fourier transformed spectrum is decreased by by-band gain-control parts 64L and 64R, and when a decision is made that they are sound components that have arrived from the target direction, it is increased. Thereafter, inverse fast-Fourier transformation is performed by IFFT parts 65L and 65R of the transformed spectrum and it is output by returning it to a time signal.

Through this method, it is possible to calculate the precise arrival direction of the sound components, that is to say, the sound source direction, from the phase difference by taking the frequency at which the installation interval w of the 2 mics becomes a half wavelength as the upper-limit frequency of the audio enhancement processing.

(Regarding the Index)

The index that records the zoom-factor information records at the time of compression recording of the audio signal for each frame, which is its processing unit. In the case in which, for example, a recording is made as a sampling signal of 48 kHz in MPEG-AAC, 1 frame, which is the processing unit, is 1024 samples and is equivalent to about 21.3 msec from $1024 \div (48 \times 10^3) \cong 2.13 \times 10^{-2}$. Accordingly, a recording may be made of the zoom-factor information of the image for each 21.3 msec, synchronous with the start of recording. In addition, in the Dolby Digital method, 1 frame is 1536 samples and when a recording is made as a 48-kHz sampling signal, the zoom-factor information of the image may be recorded every 32 msec given that $1536 \div (48 \times 10^3) = 3.2 \times 10^{-2}$.

Example 2

Figure 15:
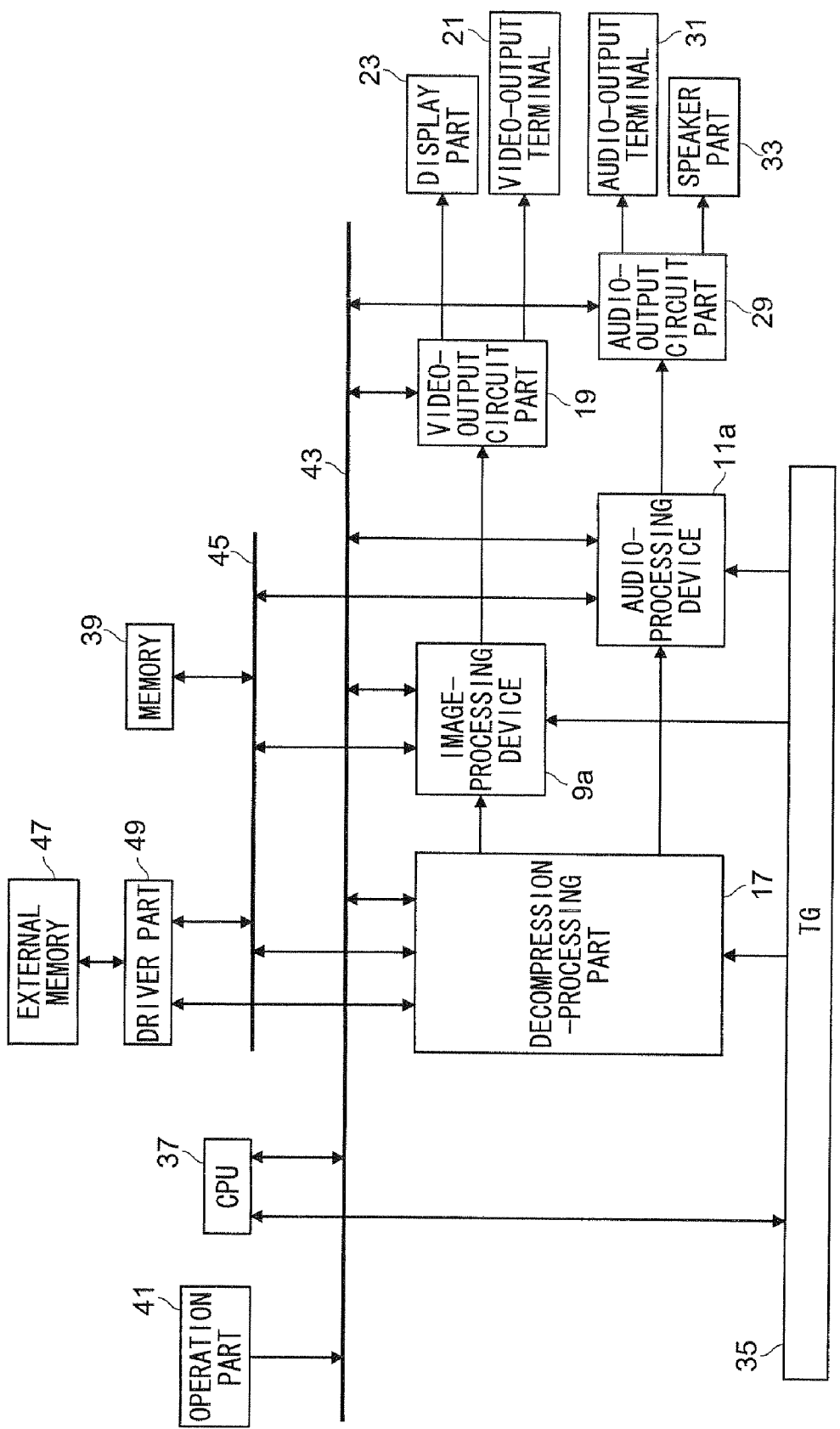
FIG. 15 is a block diagram showing the internal configuration of the playback device according to an Example 2 of the present invention.

In Example 1, we presented an imaging device of the configuration shown in FIG. 1 as an example and explained the audio-processing method of the present invention, but the audio-processing method of the present invention may be used in playback devices that allow for audio and video output, such as DVD players and video decks that connect to liquid crystal displays and plasma displays, without being limited to imaging devices. FIG. 15 shows, as an example, a playback device that is provided with an audio-processing device (equivalent to audio-processing part 11) to conduct the audio-processing method of the present invention.

The playback device shown in FIG. 15 is, in the same manner as the imaging device shown in FIG. 1, provided with driver part 49; decompression-processing part 17; video-output circuit part 19; video-output terminal 21; display part 23; audio-output circuit part 29; audio-output terminal 31; speaker part 33; TG 35; CPU 37; memory 39; manipulation part 41; bus line 43; bus line 45; and external memory 47. In contrast to the imaging device of FIG. 1, in place of image-processing part 9, it is provided with image-processing device 9a, which processes image signals obtained from decompression-processing part 17, and in place of audio-processing part 11, it is equipped with audio-processing part 11a, which processes audio signals obtained from decompression-processing part 17. The image-processing device 9a is provided with face-detection device 91 as shown in FIG. 6 and audio-processing device 11a is configured in the same manner as audio-processing part 11 of FIG. 9. External memory 47 can maintain shooting mode information (it is possible to interpret this as information indicating the rotation state of rotation part 25, information indicating the rotation state of the display-system rotation part 25A and the optical-system rotation part 25B of Examples 3 and 4, and information indicating imaging part 511 and 512, which engage in shooting, and display part 23, which engages in display, in Example 5), audio signals on which audio correction processing has yet to be implemented, and zoom-factor information at the point the concerned audio signal is obtained as an index, not just image signals that have been recorded and audio signals on which audio correction processing has been performed in Example 1 and Examples 3-5 described below. Also, it is possible to engage in the audio-processing method of the present invention in audio-processing device 11a from face-detection signals output from face-detection device 91 of image-processing device 9a, shooting mode information, and audio signals output from external memory 47 and on which audio correction has not been implemented and zoom-factor information.

Note that in cases in which zoom-factor information is not included as in videos recorded by imaging devices other than those of Example 1 and the later-described Examples 3-5, it is acceptable for image signals and audio signals that are recorded to external memory 47 to undergo audio correction processing on the basis of the size in the image of the subject that is the target in audio-processing device 11a.

In addition, in the imaging devices of Example 1 or the later-described Examples 3-5, the image-processing part 9 may perform the face detection at the time of the shooting and record the detection results to external memory 47. In this case, in the playback device of this example, the image-processing device 9a need not perform the face detection as the audio-processing device 11a can obtain face-detection signals from the external memory 47.

Example 3

For Example 1, we provided an example in which we implemented the present invention in an imaging device in which display part 23 could be rotated, but the configurations of imaging devices in which the present invention can be implemented are not limited to this example. Specifically, it would be possible to implement the present invention in imaging devices in which a member other than display part 23 rotates. To start, we will provide an explanation with reference to figures of an example in which we have implemented the present invention in an imaging device in which display part 23 and optical-system members, such as the image sensor 1 and lens part 3 (hereinafter, noted as imaging part 51) are individually rotatable, presenting it as Example 3.

Figure 16:
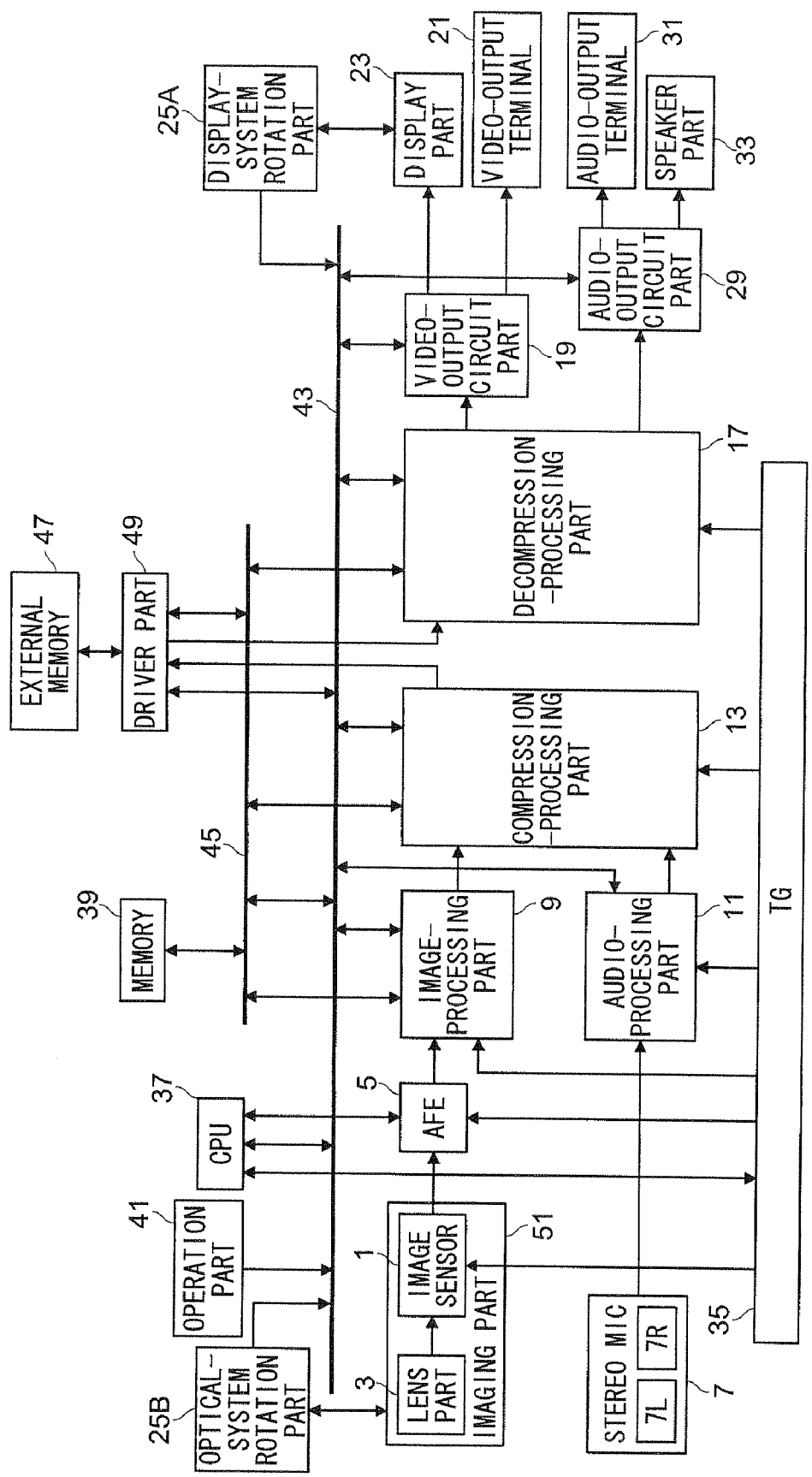
FIG. 16 is a block diagram showing an outline of the configuration of the imaging device according to an Example 3 of the present invention.
Figure 17:
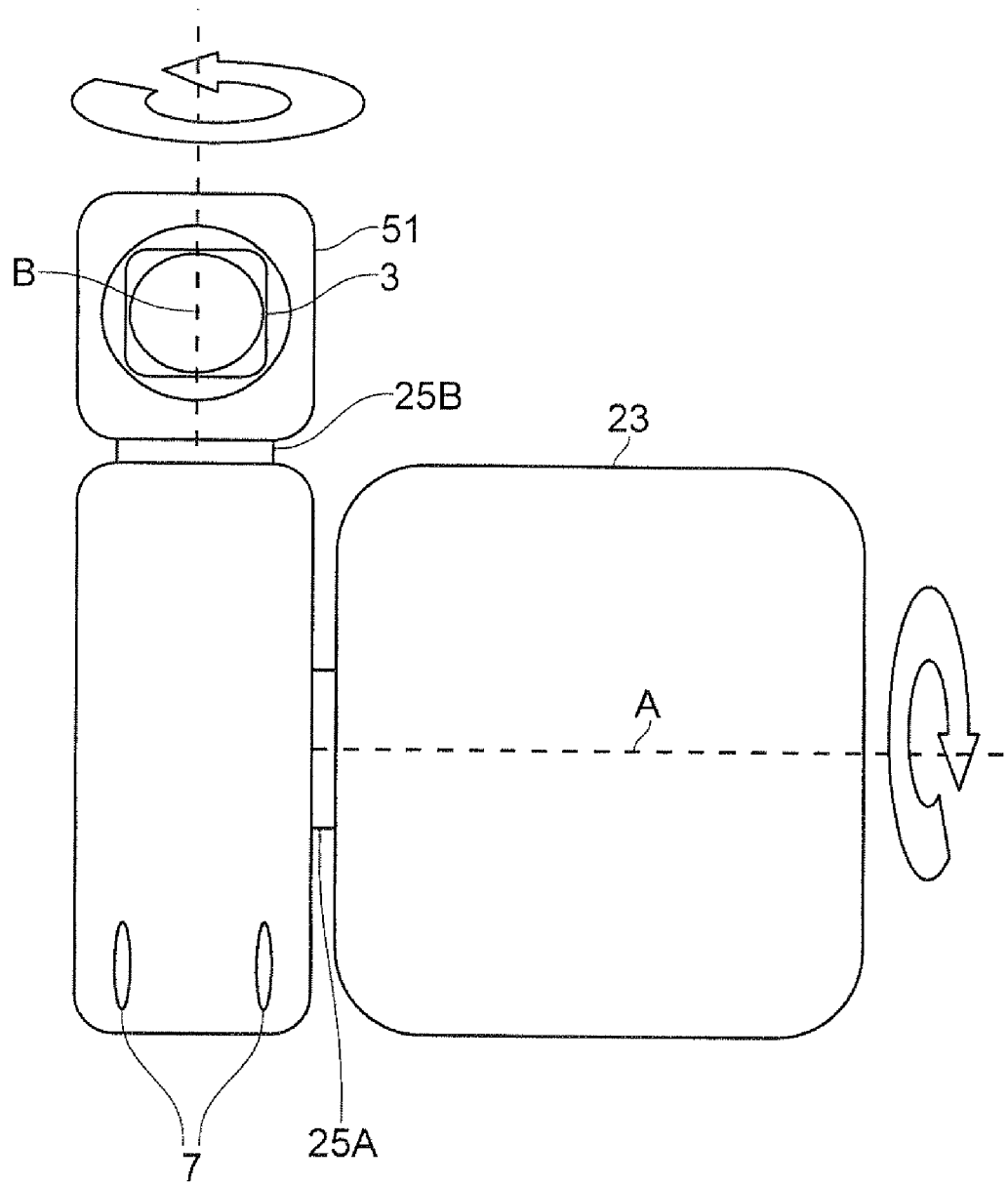
FIG. 17 is an illustration showing an outline of an external view of the imaging device according to the Example 3 of the present invention.

FIG. 16 is a block diagram that shows an outline of the internal configuration of the imaging device of this example and it is equivalent to FIG. 1 shown in Example 1. In addition, FIG. 17 is an illustration showing an outline of an external view of the imaging device of this example and it is equivalent to FIG. 2A and FIG. 2B that showed Example 1. Note that in FIG. 16, we have used the same codes for portions that are the same as in FIG. 1 and in FIG. 17, we have used the same codes for portions that are the same as in FIG. 2A and FIG. 2B and so will omit detailed explanations of those.

As shown in FIG. 16, the imaging device of this example, the same as with the imaging device shown in FIG. 1, is provided with image sensor 1; lens part 3; AFE 5; stereo mic 7; image-processing part 9; audio-processing part 11; compression-processing part 13; decompression-processing part 17; video-output circuit part 19; video-output terminal 21; display part 23; audio-output circuit part 29; audio-output terminal 31; speaker part 33; TG 35; CPU 37; memory 39; manipulation part 41; bus line 43; bus line 45; external memory 47; and driver part 49. In contrast to the imaging device of FIG. 1, it is provided with a display-system rotation part 25A that will rotate display part 23 and optical-system rotation part 25B that will rotate imaging part 51.

In addition, as shown in FIG. 17, the display-system rotation part 25A allows for rotation of display part 23, the same as the above-described rotation part 25 (refer to FIG. 2A and FIG. 2B). On the other hand, optical-system rotation part 25B makes it possible to rotate imaging part 51. Note that in FIG. 17, rotation axis A of display-system rotation part 25A and rotation axis B of optical-system rotation part 25B are shown as being roughly perpendicular, but being roughly parallel or in another relationship would be acceptable.

Figure 18:
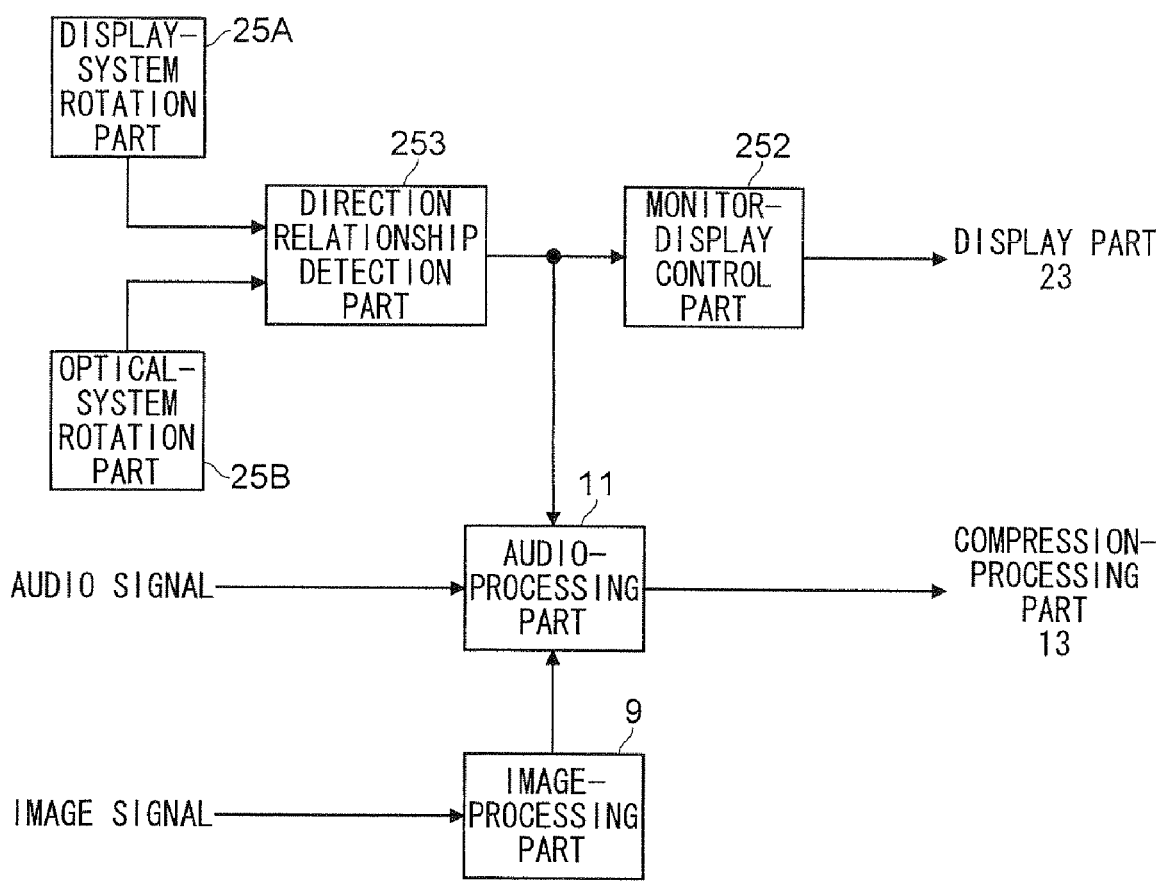
FIG. 18 is a block diagram showing the configuration of required parts of the imaging device according to the Example 3 of the present invention.

In addition, FIG. 18 is a block diagram showing the configuration of essential parts of the imaging device of this example and it shows a portion related to audio correction processing, which audio-processing part 11 can perform. The imaging device of this example is provided with direction-relationship detection part 253, which detects the relative relationship of display part 23 and imaging part 51, and monitor-display control part 252, which conducts display control of the monitor in response to the relationship that direction-relationship detection part 253 detects, in addition to the above-described display-system rotation part 25A and optical-system rotation part 25B. In addition, display-system rotation part 25A detects the rotation of display part 23 (for example, the presence of rotation at or above a certain degree and rotation angle) with the same method as the above-described rotation part 25. In addition, optical-system rotation part 25B as well detects the rotation of imaging part 51 (for example, the presence of rotation at or above a certain degree and rotation angle) by the same method as that of the above-described rotation part 25, and outputs it.

Direction-relationship detection part 253 will determine the relative relationship between the display direction (paper surface far direction in FIG. 17) and the shooting direction (paper surface near direction of FIG. 17) by referring to the output results of display-system rotation part 25A and optical-system rotation part 25B.

In addition, direction-relationship detection part 253 may select the shooting mode through the same method as that of rotation-detection part 251 of Example 1. Specifically, when the display direction and the shooting direction are, for example, in the opposite direction (for example, the state shown in FIG. 17), it will select the ordinary shooting mode. On the other hand, when the display direction and the shooting direction are roughly in the same direction (for example, the case in which either one of the display part 23 or the imaging part 51 is rotated from the state in FIG. 17), it will select the self-shooting mode.

Monitor-display control part 252 and audio-processing part 11 will perform the same operations as in Example 1 according to the shooting mode that direction-relationship detection part 253 has selected (for example, up-down direction and left-right direction control of the preview-use image displayed on display part 23, display of information indicating the shooting mode, and audio-correction processing). In addition, image-processing part 9 as well will perform the same operations as in Example 1 (for example, face-detection processing).

As indicated above, even in the case in which the imaging part 51, and not just display part 23, can be rotated, it is possible to implement on the audio obtained together with the image, audio-correction processing according to the relationship between the display direction and the shooting direction (for example, the shooting mode) and the condition of a specified subject in an image (for example, the location of a person and the size of the face). Thus, it is possible to obtain audio that is in keeping with the operator's intentions for the shooting.

Note that the direction-relationship detection part 253 and monitor-display control part 252 of this example may be interpreted as a part of CPU 37.

Example 4

Next, we will explain with reference to diagrams an example in which the present invention has been implemented in an imaging device in which the imaging part 51 can be rotated (provided with optical-system rotation part 25B described in Example 3) and display part 23 does not rotate (not provided with rotation part 25 described in Example 1 and display-system rotation part 25A described in Example 3), taking this example as Example 4.

Figure 19A:
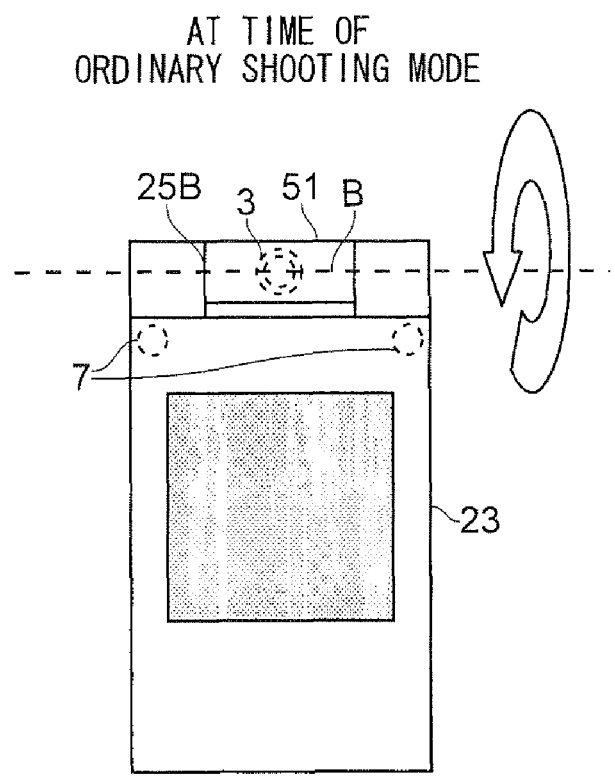
FIG. 19A is an illustration showing an outline of an external view of the imaging device according to an Example 4 of the present invention.
Figure 19B:
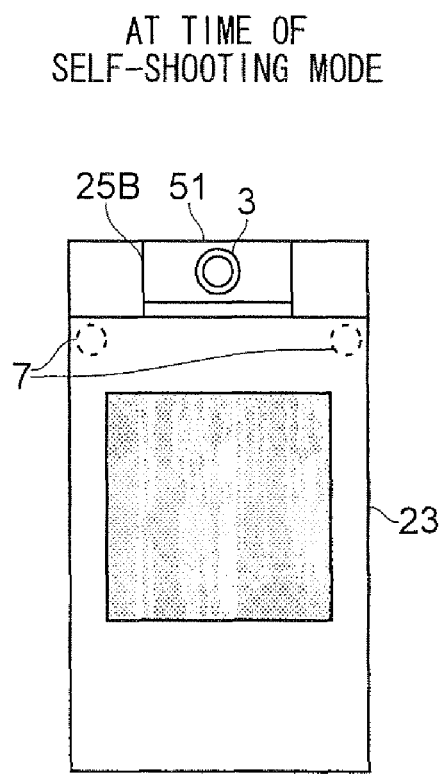
FIG. 19B is an illustration showing an outline of an external view of the imaging device according to the Example 4 of the present invention.

FIGS. 19A and 19B are illustrations showing outlines of external views of the imaging device of this example and they correspond to FIG. 2A and FIG. 2B that illustrated Example 1 and FIG. 17 that illustrated Example 3. Note that for portions in FIG. 19A and FIG. 19B that are the same as those in FIG. 2A and FIG. 2B and FIG. 17, we have assigned the same codes and will omit detailed explanations of those. Note that the configuration of the imaging device of this example is interpreted as that of the imaging device of Example 3, which is shown in FIG. 16, excluding display-system rotation part 25A and so we will omit a detailed explanation of such and diagrams. Furthermore, the optical-system rotation part 25B with which the imaging device of this example is provided is interpreted as having the same configuration as rotation part 25 shown for Example 1 (refer to FIG. 5) and so we will omit a detailed explanation of such and diagrams.

As shown in FIG. 19A and FIG. 19B, the imaging device of this example is provided with an optical-system rotation part 25B in which rotation axis B is roughly parallel to the monitor (the gray portion in the figure) and it makes it possible to rotate imaging part 51. Note that FIG. 19A and FIG. 19B illustrate a configuration in which the rotation axis B of optical-system rotation part 25B is roughly parallel (paper-surface left-right direction) with the top edge and the bottom edge of the monitor, but a relationship of roughly perpendicular (paper-surface up-down direction) or other relationship would be acceptable. In addition, FIG. 19A and FIG. 19B illustrate a configuration in which stereo mic 7 is situated on the surface that is opposite the surface where the imaging device monitor is situated, but stereo mic 7 may be situated on any surface of the imaging device.

For example, as shown in FIG. 19A, the portion corresponding to rotation-detection part 251 of optical-system rotation part 25B (refer to FIG. 5) selects the ordinary shooting mode in the case in which the display direction (paper-surface near direction) and shooting direction (paper-surface far direction) are in the opposite directions. On the other hand, it selects the self-shooting mode in the case in which, as shown in FIG. 19B, the display direction (paper-surface near direction) and the shooting direction (paper-surface near direction) are roughly in the same direction.

In addition, the part corresponding to monitor-display control part 252 of optical-system rotation part 25B (refer to FIG. 5) and audio-processing part 11 perform operations that are the same as those in Example 1 (for example, control in the up-down direction and left-right direction of the preview-use image shown in display part 23, the display of information indicating the shooting mode, and audio-correction processing) according to the shooting mode that the part corresponding to rotation-detection part 251 of optical-system rotation part 25B has selected (refer to FIG. 5). In addition, image-processing part 9, as well, performs the same operations (for example, face-detection processing) as in Example 1.

As noted above, even in cases in which imaging part 51 can rotate, audio-correction processing suited to the relationship between the display direction and the shooting direction (for example, the shooting mode) and the state of a specified subject in an image (for example, the location of a person and the size of the face) can be implemented on the audio obtained along with the image. Thus, it is possible to obtain audio that is in keeping with operator's intentions for the shooting.

Example 5

Next, we will explain with reference to diagrams an example in which the present invention has been implemented in an imaging device in which the imaging part and display part 23 do not rotate (is not provided with the rotation part 25 described in Example 1 and is not equipped with display-system rotation part 25A and optical-system rotation part 25B described in Example 3) and is provided with multiple imaging parts that make it possible to switch the need for shooting, taking this example as Example 5.

Figure 20:
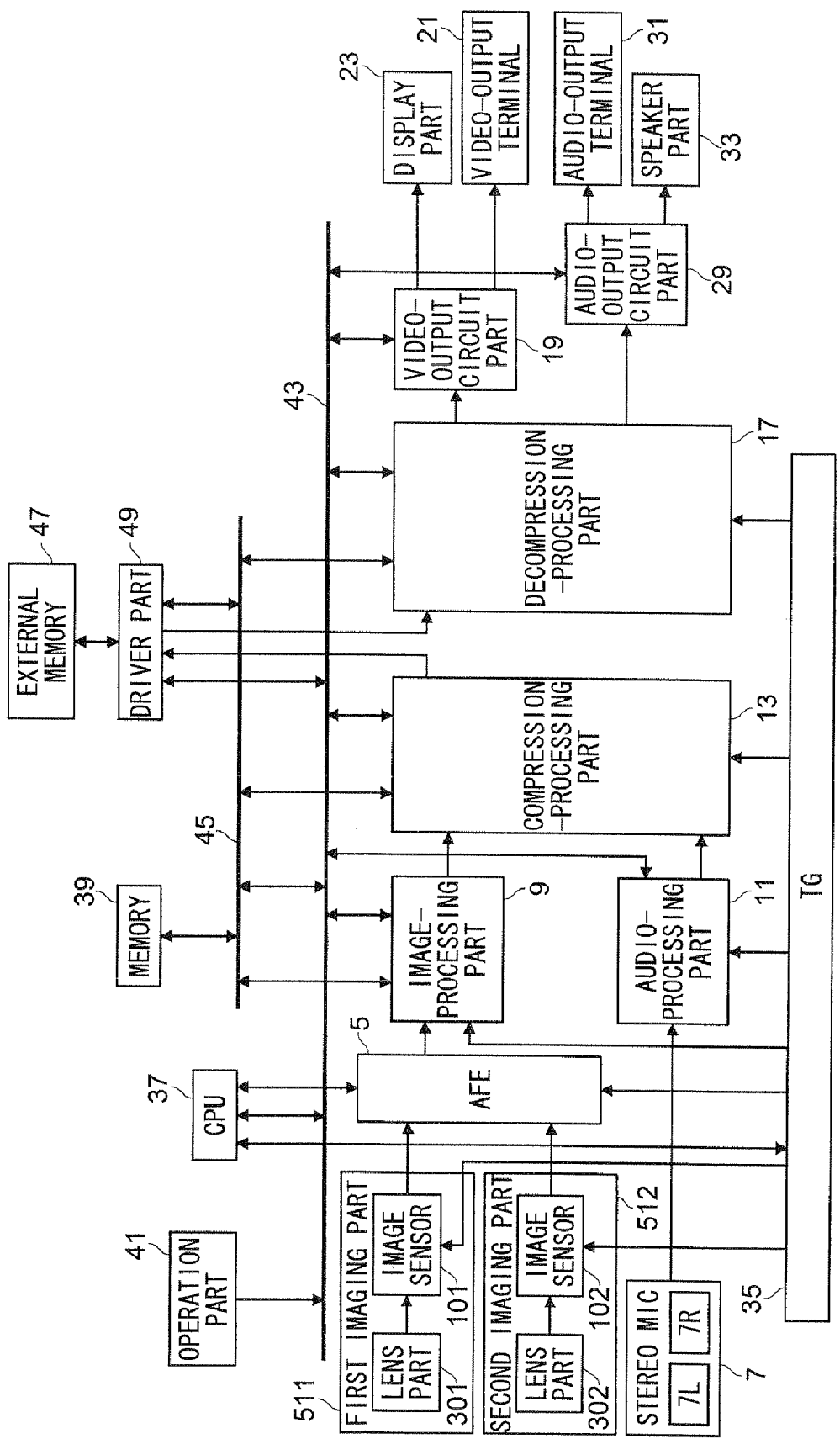
FIG. 20 is a block diagram showing an outline of the configuration of the imaging device according to an Example 5 of the present invention.
Figure 21:
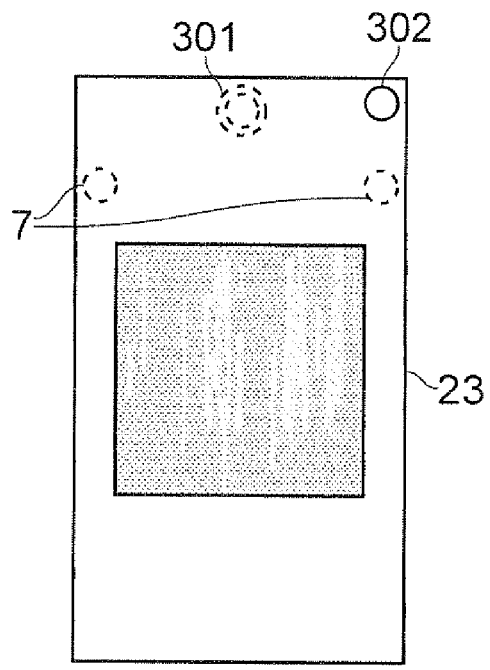
FIG. 21 is an illustration showing an outline of an external view of the imaging device according to an Example 5 of the present invention.

FIG. 20 is a block diagram that shows the outline of the internal configuration of the imaging device of this example and it corresponds to FIG. 1, which illustrated Example 1. In addition, FIG. 21 is an illustration showing an outline of an external view of the imaging device of this example and it corresponds to FIG. 2A and FIG. 2B, which illustrated Example 1. Note that for portions in FIG. 20 that are the same as those in FIG. 1 and for those shown in FIG. 21 that are the same as those shown in FIG. 2A and FIG. 2B, we have assigned the same codes and will omit a detailed explanations of those.

As shown in FIG. 20, the imaging device of this example is provided in the same manner as the imaging device shown in FIG. 1 with AFE 5; stereo mic 7; image-processing part 9; audio-processing part 11; compression-processing part 13; decompression-processing part 17; video-output circuit part 19; video-output terminal 21; display part 23; audio-output circuit part 29; audio-output terminal 31; speaker part 33; TG 35; CPU 37; memory 39; manipulation part 41; bus line 43; bus line 45; external memory 47; and driver part 49. In contrast to the imaging device of FIG. 1, it is provided with first imaging part 511, which is provided with image sensor 101 and lens part 301, and second imaging part 512, which is provided with image sensor 102 and lens part 302.

One of either first imaging part 511 or second imaging part 512 will perform the shooting according to, for example, the instruction of the user input via manipulation part 41. Specifically, CPU 37 determines the need for shooting for each the first imaging part 511 and second imaging part 512 on the basis of the instruction of a user that has been input via manipulation part 41.

As shown in FIG. 21, the display direction of display part 23 (paper-surface near direction) and the shooting direction of first imaging part 511 (direction in which lens part 301 faces. Paper-surface far direction) are in opposite direction. That is to say, the case in which first imaging part 511 shoots corresponds to the ordinary shooting mode in the various examples described above. On the other hand, the display direction of display part 23 (paper-surface near direction) and the shooting direction of second imaging part 512 (direction in which lens part 302 is facing. Paper-surface near direction) are roughly the same. That is to say, the case in which second imaging part 512 shoots corresponds to the self-shooting mode of the various examples described above. Note that FIG. 21 illustrates a configuration in which stereo mic 7 is situated on the surface that is the opposite the surface where the monitor of the imaging device is situated, but stereo mic 7 may be situated on any surface of the imaging device.

In this example, CPU 37, for example, performs operations that are the same as those of rotation-detection part 251 and monitor-display control part 252 in Example 1 (refer to FIG. 5). That is to say, CPU 37 performs control in the up-down direction and left-right direction of the preview-use image shown on display part 23, display instruction of information indicating the shooting mode, and notification of the shooting mode to audio-processing part 11. In addition, audio-processing part 11 performs, for example, audio-correction processing on the basis of the shooting mode that has been notified from CPU 37. In addition, image-processing part 9 performs the same operations as in Example 1 (for example, face-detection processing).

As described above, even in the case in which it is possible to switch the necessity of operation of multiple imaging parts (first imaging part 511 and second imaging part 512) that do not rotate, it is possible to implement audio-correction processing according to relationship between the display direction and the shooting direction (for example, the shooting mode) and the state of a specified subject in an image (for example, the location of a person and the size of the face) on audio obtained along with the image. Thus, it is possible to obtain audio that is in keeping with the operator's intentions for the shooting.

Note that for this example, an example is shown in which the present invention is implemented in an imaging device provided with 2 imaging parts (first imaging part 511 and second imaging part 512), but it would be possible to implement the present invention similarly in an imaging device provided with 3 or more imaging parts.

In addition, this example is an example in which the present invention is implemented in an imaging device provided with multiple imaging parts 511 and 512 that allow for the switching of the necessity of shooting, but it would be possible to implement the present invention in the same manner as this example in an imaging device provided with multiple display parts that allow for the switching of the necessity of display as well. In addition, it would be possible to implement the present invention in the same manner as in this example in an imaging device provided with each multiple imaging parts that allow for the switching of the necessity of display and multiple display parts that allow for the switching of the necessity of display. We will omit a detailed explanation of these as they are the same as being able to implement the present invention in an imaging device in which either the display part or the imaging part or both can be rotated (refer to Example 1 and Example 3 and Example 4).

In addition, multiple stereo mics that allow for switching of the necessity of sound collection may be provided, without being limited to the imaging part and the display part. Furthermore, the stereo mic that performs the sound collection may be switched by being linked to the switching of the imaging part that performs the shooting and the display part that performs the display and to the rotation of these.

Example 6

As in the imaging devices shown in FIG. 17, FIG. 19A and FIG. 19B, and FIG. 21 cases can arise in which independent of stereo mic 7, imaging part 51 will rotate and the existence of shooting can be switched and cases in which the image that imaging part 51 obtains and the various audio channels that stereo mic 7 obtains do not correspond. For example, in the case in which the sound that is collected by the mic on the left side of the paper surface of FIG. 19A and FIG. 19B belongs to the right channel and the sound that is collected by the mic on the right side of the paper surface belongs to the left channel, in the state shown in FIG. 19A (the display direction and the shooting direction are the opposite direction. Ordinary shooting mode.), the image and the audio channel will correspond, but in the state shown in FIG. 19B (display direction and shooting direction are roughly the same direction. Self-shooting mode), they will not correspond.

We will provide a concrete explanation of this. In the above-described example, in the case of the ordinary shooting mode of FIG. 19A, the sound that is collected by the mic that ends up on the left side (paper-surface left side) when facing the shooting direction (paper-surface far direction) is in the left channel and the sound that is collected by the mic that ends up on the right side (paper surface right side) is in the right channel. That is to say, the image and audio channels correspond. In contrast, in the case of the self-shooting mode of FIG. 19B, the sound collected by the mic that ends up on the left side (paper-surface left side) when facing the shooting direction (paper-surface near direction) is in the left channel and the sound that is collected by the mic that ends up on the left side (paper-surface left side) is in the right channel. That is to say, the image and the audio channels do not correspond.

Thus, we will explain with reference to diagrams an example of a configuration that will resolve these problems, taking it as Example 6. Note that this example can be interpreted as a modified example of the above-described Example 1 and Examples 3-5.

Figure 22:
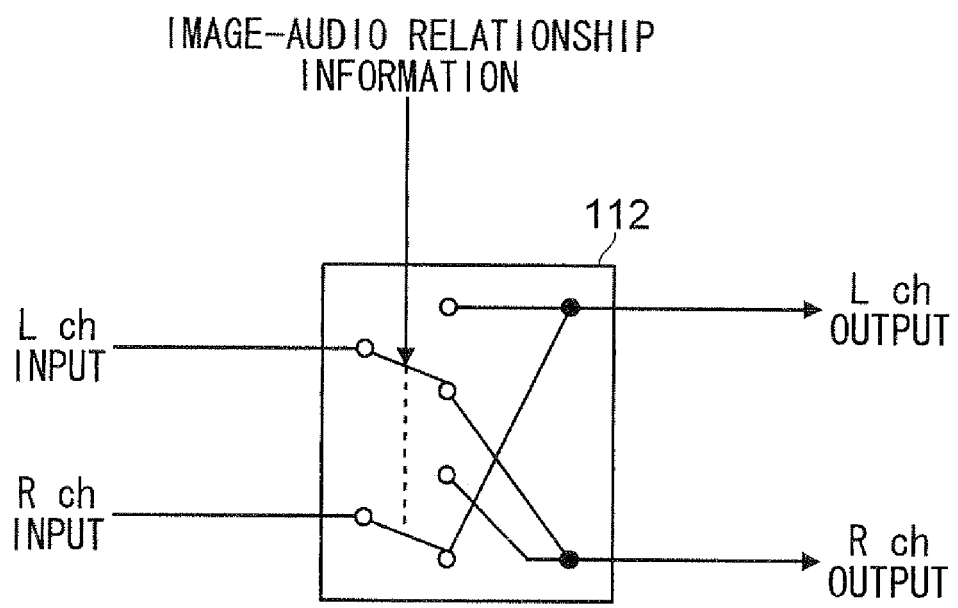
FIG. 22 is a block diagram showing the configuration of essential parts of control-switch part 112, which is provided in the imaging device according to an Example 6 of the present invention.

In this example, the above-noted control-switching part 112 (refer to FIG. 9), for example, conducts processing to control the audio channel. We will explain with reference to FIG. 22 a concrete example of this control-switching part 112. FIG. 22 is a block diagram that shows the configuration of the essential parts of control-switching part 112, which is provided in the imaging device in this example. As shown in FIG. 22, control-switching part 112 decides on the channel (L ch output, R ch output) where the audio of the respective channels input (L ch input, R ch input) will be output, on the basis of the image-audio relationship information, which is the information that indicates the relationship between the shooting direction of imaging part 51 and the direction in which stereo mic 7 collects sound.

CPU 37, for example, can generate the image-audio relationship information on the basis of shooting mode information (can be interpreted as information indicating the rotation state of rotation part 25 and display-system rotation part 25A and optical-system rotation part 25B and information indicating imaging part 511 and 512, which perform shooting, and display part 23, which performs display) and the position of the stereo mic that performs the sound collection. Note that as in the imaging device shown in FIG. 17, FIG. 19A and FIG. 19B, and in FIG. 21, in the case in which a decision is made as to whether or not the image and audio channel correspond to the shooting mode, the image-audio relationship information can be taken as the shooting mode information.

For example, in the case of the ordinary shooting mode of FIG. 19A as described above, the image and audio channel corresponded and thus output is performed without switching the input channel and the output channel (L ch input as L ch output and R ch input as R ch output). In contrast, in the case of the self-shooting mode of FIG. 19B, the image and audio channels do not correspond and thus output is performed by switching the input channel and the output channel (L ch input as R ch output and R ch input as L ch output).

As described above, it is possible to correct such that the image after the sound collection and the audio channel correspond, even with a configuration in which it is possible to obtain results in which the image and audio channel do not correspond by means of the rotation of the imaging part and the display part and the switching of the shooting of multiple imaging parts and the display of multiple display parts.

Note that as stated in Example 5, it is acceptable to make the image and audio channels correspond by providing multiple pairs of stereo mics that allow for the switching of the necessity of sound collection and switching the stereo mic that is to collect sound according to the shooting mode.

In addition, it is possible to make the application of this example unnecessary with a configuration in which, as in the imaging device shown in Example 1, only the display part 23 rotates or a configuration in which the imaging part 51 and the stereo mic 7 rotate linked.

VARIATION

In the imaging device and playback device of a form that implements the present invention, it is acceptable to have a control device, such as a microcomputer, perform operations of, for example, image-processing part 9 and image-processing device 9a, audio-processing part 11, and audio-processing device 11a. Furthermore, all or a portion of the functions realized by a control device in this way, may be described as a program and all or a portion of these functions may be realized by executing such a program on a program execution device (for example, a computer).

In addition, the imaging device shown in FIG. 1, FIG. 16, and FIG. 20; the image-processing part 9 shown in FIG. 1, FIG. 6, FIG. 16, FIG. 18, and FIG. 20; the audio-processing part 11 shown in FIG. 1, FIG. 9, FIG. 16, FIG. 18, and FIG. 20; and the playback device 15, the image-processing device 9a, and the audio-processing device 11a shown in FIG. 15 may be realized through hardware or hardware and software combinations, not being limited to the cases described above. In addition, in cases in which portions of the imaging device, image-processing part 9, image-processing device 9a, audio-processing part 11, and audio-processing device 11a are configured using software, the blocks of areas that are realized through software are presumed to express the function blocks of those areas.

Above, we have explained individual examples of the present invention, but the present invention is not limited to these examples and variations and alterations within the scope of its essence are possible.

What is claimed is:

1. An imaging device comprising:
   at least one imaging part to obtain images through shooting;
   at least one sound-collection part to obtain audio by collecting it along with the shooting by the imaging part;
   a specified-subject detection part to detect a specified subject from the image;
   at least one display part to display the image;
   a direction-relationship detection part to detect the relative relationship of the direction in which the display part displays the image and the direction in which the imaging part shoots; and
   an audio-correction part to perform audio-correction processing on the audio obtained through the sound-collection part according to the detection results for the specified subject detected by the specified-subject detection part and the relationship that is detected by the direction-relationship detection part.

2. The imaging device according to claim 1 further comprising:
   a rotation part that makes it possible to rotate at least one of the display part and the imaging part,
   wherein,
   in the case in which the direction-relationship detection part detects on the basis of that rotation part that the direction in which the display part displays the image and the direction in which the imaging part shoots are closer than a certain degree and in which the specified-subject detection part detects a specified subject from the image, the audio-correction part implements the audio-correction processing on the audio obtained from the sound-collection part.

3. The imaging device according to claim 1 further comprising:
a notification part to provide notification of the content of the audio-correction processing,
wherein,
when the audio-correction part implements the audio-correction processing on the audio obtained from the sound-collection part, the notification part makes notice of the content of the audio-correction processing.

4. The imaging device according to claim 1,
wherein the audio-correction part performs as one of the audio-correction processes, processing to enhance the components that have arrived and been collected from the direction in which the specified subject exists, among audio collected from the sound-collection part.

5. The imaging device according to claim 1 further comprising:
a specification part to specify the largest specified subject among multiple specified subjects in the case in which multiple specified subjects are detected through the specified-subject detection part,
wherein, the audio-correction part performs as one of the audio-correction processes, processing to enhance the components that have arrived and been collected from the direction where a specified subject exists, which is specified through the specification part, among the audio collected from the sound-collection part.

6. The imaging device according to claim 1 further comprising:
a verification part to engage in verification of the various characteristics of multiple specified subjects and the prepared characteristics of specified subject images in cases in which multiple specified subjects are detected from the specified subject detection part,
wherein, the audio-correction part performs as one of the audio-correction processes, processing to enhance components arriving from the direction where the specified subject exists in cases in which specified subjects exist that are presumed to have characteristics that match according to the verification part, among audio collected from the sound-collection part.

7. The imaging device according to claim 1,
wherein,
the audio-correction part performs as one of the audio-correction processes, processing of at least one of signal-level adjustment processing in which the signal-level of components that have arrived and been collected from a specified location among the audio collected by the sound-collection part is adjusted, and
band-signal-level adjustment processing in which the signal-level of a specified frequency band of the audio is adjusted.

8. The imaging device according to claim 1, wherein, the specified subject is the face of a person.

9. The imaging device according to claim 1 further comprising:
an image-audio relationship detection part to detect the relative relationship between the direction in which the imaging part shoots and the directions in which at least two of the sound-collection parts each collect sound,
wherein,
when the sound-collection parts each collect sound that belongs to different channels, the audio-correction part corrects the channel to which the audio that the sound-collection parts have obtained belongs, according to the relationship detected by the image-audio relationship detection part.

10. The imaging device according to claim 9 further comprising:
a rotation part that makes it possible to rotate the imaging part and the sound-collection part independently,
wherein, in the case in which the image-audio relationship detection part detects on the basis of the rotation part the presence of a switch in the respective directions in which at least two sound-collection parts are collecting with respect to the direction in which the imaging part shoots and the image-audio relationship part detects the switch, the audio-correction part can switch the channels to which the audio belongs that the sound-collection parts where the switches were detected respectively obtained.

11. A playback device comprising:
a playback part that plays back images obtained through shooting and audio collected and obtained together with the shooting of the images;
a direction-relationship detection part that detects the relative relationship between the direction in which the image was shot and the direction in which the image was displayed at the time of shooting;
a specified-subject detection part to detect a specified subject from the image; and
an audio-correction part to implement audio-correction processes on the audio that the playback part plays back, according to the specified subject detected by the specified-subject detection part and the relationship detected by the direction-relationship detection part.

12. The playback device according to claim 11 further comprising:
at least one imaging part to collect the images through shooting;
at least one sound-collection part to obtain the audio, collecting it together with the shooting of the imaging part;
at least one display part to display the image;
a rotation part that makes it possible to rotate at least one of the display part and the imaging part; and
a recording part to record the rotation information indicating the state of rotation of the rotation part together with the images and the audio,
wherein,
in the case in which the direction-relationship detection part detects from the rotation information that is recorded in the recording part that the direction in which the display part displays the image and the direction in which the imaging part shoots is closer than a certain degree and in which the specified-subject detection part detects a specified subject from within an image, the audio-correction part implements audio-correction processing on the audio that the playback part plays back.

* * * * *